(12) United States Patent
Uchino et al.

(10) Patent No.: US 9,909,657 B2
(45) Date of Patent: Mar. 6, 2018

(54) CONTINUOUSLY VARIABLE TRANSMISSION

(75) Inventors: Satoshi Uchino, Wako (JP); Atsushi Fujikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 633 days.

(21) Appl. No.: 14/400,989

(22) PCT Filed: May 22, 2012

(86) PCT No.: PCT/JP2012/063029
§ 371 (c)(1),
(2), (4) Date: Nov. 13, 2014

(87) PCT Pub. No.: WO2013/175568
PCT Pub. Date: Nov. 28, 2013

(65) Prior Publication Data
US 2015/0133257 A1 May 14, 2015

(51) Int. Cl.
*F16H 37/02* (2006.01)

(52) U.S. Cl.
CPC ......... *F16H 37/021* (2013.01); *F16H 37/022* (2013.01); *F16H 2037/025* (2013.01); *F16H 2037/026* (2013.01); *F16H 2200/0008* (2013.01)

(58) Field of Classification Search
CPC .................................................. F16H 37/021
See application file for complete search history.

(56) References Cited

U.S. PATENT DOCUMENTS

| 4,458,558 A | 7/1984 | Frank |
| 4,539,866 A | 9/1985 | Koivunen |
| 4,852,427 A | 8/1989 | van der Veen |

(Continued)

FOREIGN PATENT DOCUMENTS

| CN | 1705836 A | 12/2005 |
| CN | 1945062 A | 4/2007 |

(Continued)

OTHER PUBLICATIONS

Office Action dated May 20, 2016, issued in counterpart Chinese Patent Application No. 201280073366.0, with English translation. (14 pages).

(Continued)

*Primary Examiner* — Derek D Knight
(74) *Attorney, Agent, or Firm* — Westerman, Hattori, Daniels & Adrian, LLP

(57) ABSTRACT

The driving force from a drive source is transmitted from a main input shaft to a continuously variable transmission mechanism through an input switching mechanism and a first input path in which a first speed-reducing gear is disposed, and is further transmitted to a first output path in which a second speed-reducing gear is disposed, thus establishing a LOW mode. And the driving force is transmitted from the main input shaft to the continuously variable transmission mechanism through the input switching mechanism and a second input path in which a speed-increasing gear, and is further transmitted to a second output path in which a third speed-reducing gear, thus establishing a HI mode. The first speed-reducing gear on the input side, the speed-increasing gear on the input side and the second and third speed-reducing gears on the output side are independent from each other.

20 Claims, 24 Drawing Sheets

(56) References Cited

U.S. PATENT DOCUMENTS

2007/0021259 A1  1/2007  Tenberge
2009/0017959 A1  1/2009  Triller

FOREIGN PATENT DOCUMENTS

| DE | 4207093 A1 | 4/1993 |
|---|---|---|
| DE | 4234629 A1 | 4/1993 |
| DE | 19631072 A1 | 2/1998 |
| EP | 0 130 904 A1 | 1/1985 |
| JP | 60-113850 A | 6/1985 |
| JP | 03-048377 B2 | 7/1991 |
| JP | 2000-320630 A | 11/2000 |
| JP | 2008-208854 A | 9/2008 |
| JP | 2009-503379 A | 1/2009 |
| JP | 2010-261544 A | 11/2010 |

OTHER PUBLICATIONS

Decision of Granting a Patent dated Sep. 30, 2015, issued in corresponding Japanese patent application No. 2014-516551. (3 pages).
International Search Report dated Jul. 3, 2012, issued in corresponding application No. PCT/JP2012/063029.

| TRANSITION MODE 1 | |
|---|---|
| INPUT SWITCHING MECHANISM 24 | LOW (RIGHTWARD MOVEMENT) |
| FIRST OUTPUT SWITCHING MECHANISM 32 | ON |
| SECOND OUTPUT SWITCHING MECHANISM 30 | ON |
| FORWARD-REVERSE SWITCHING MECHANISM 16 | FORWARD |

| DIRECTLY COUPLED LOW MODE | |
|---|---|
| INPUT SWITCHING MECHANISM 24 | LOW (RIGHTWARD MOVEMENT) |
| FIRST OUTPUT SWITCHING MECHANISM 32 | OFF |
| SECOND OUTPUT SWITCHING MECHANISM 30 | ON |
| FORWARD-REVERSE SWITCHING MECHANISM 16 | FORWARD |

LOW MODE

| LOW CLUTCH 24A | ON |
|---|---|
| HI CLUTCH 24B | OFF |
| FIRST OUTPUT SWITCHING MECHANISM 32 | ON |
| SECOND OUTPUT SWITCHING MECHANISM 30 | OFF |
| FORWARD-REVERSE SWITCHING MECHANISM 41 | FORWARD (RIGHTWARD MOVEMENT) |

TRANSITION MODE 1

| | |
|---|---|
| LOW CLUTCH 24A | ON |
| HI CLUTCH 24B | OFF |
| FIRST OUTPUT SWITCHING MECHANISM 32 | ON |
| SECOND OUTPUT SWITCHING MECHANISM 30 | ON |
| FORWARD-REVERSE SWITCHING MECHANISM 41 | FORWARD (RIGHTWARD MOVEMENT) |

TRANSITION MODE 2

| LOW CLUTCH 24A | OFF |
|---|---|
| HI CLUTCH 24B | ON |
| FIRST OUTPUT SWITCHING MECHANISM 32 | ON |
| SECOND OUTPUT SWITCHING MECHANISM 30 | ON |
| FORWARD-REVERSE SWITCHING MECHANISM 41 | FORWARD (RIGHTWARD MOVEMENT) |

HI MODE

| LOW CLUTCH 24A | OFF |
|---|---|
| HI CLUTCH 24B | ON |
| FIRST OUTPUT SWITCHING MECHANISM 32 | OFF |
| SECOND OUTPUT SWITCHING MECHANISM 30 | ON |
| FORWARD-REVERSE SWITCHING MECHANISM 41 | FORWARD (RIGHTWARD MOVEMENT) |

REVERSE MODE

| LOW CLUTCH 24A | OFF |
| --- | --- |
| HI CLUTCH 24B | ON |
| FIRST OUTPUT SWITCHING MECHANISM 32 | OFF |
| SECOND OUTPUT SWITCHING MECHANISM 30 | ON |
| FORWARD-REVERSE SWITCHING MECHANISM 41 | REVERSE (LEFTWARD MOVEMENT) |

DIRECTLY COUPLED LOW MODE

| LOW CLUTCH 24A | ON |
|---|---|
| HI CLUTCH 24B | OFF |
| FIRST OUTPUT SWITCHING MECHANISM 32 | OFF |
| SECOND OUTPUT SWITCHING MECHANISM 30 | ON |
| FORWARD-REVERSE SWITCHING MECHANISM 41 | FORWARD (RIGHTWARD MOVEMENT) |

DIRECTLY COUPLED HI MODE

| LOW CLUTCH 24A | OFF |
|---|---|
| HI CLUTCH 24B | ON |
| FIRST OUTPUT SWITCHING MECHANISM 32 | ON |
| SECOND OUTPUT SWITCHING MECHANISM 30 | OFF |
| FORWARD-REVERSE SWITCHING MECHANISM 41 | FORWARD OR NEUTRAL |

FIG.21

|  | LOW MODE | HI MODE | REVERSE MODE | LOW↔HI TRANSITION MODE |
|---|---|---|---|---|
| LOW CLUTCH 24A | ON | OFF | ON | ON→OFF |
| HI CLUTCH 24B | OFF | ON | OFF | OFF→ON |
| FIRST OUTPUT SWITCHING MECHANISM 32 | ON | OFF | OFF | ON |
| SECOND OUTPUT SWITCHING MECHANISM 30 | OFF | ON | OFF | ON |
| FORWARD-REVERSE SWITCHING MECHANISM 41 | OFF (FORWARD) | OFF (FORWARD) | ON (REVERSE) | OFF (FORWARD) |

FIG.24

|  | LOW MODE | HI MODE | REVERSE MODE | LOW↔HI TRANSITION MODE |
|---|---|---|---|---|
| LOW CLUTCH 24A | ON | OFF | ON | ON↔OFF |
| HI CLUTCH 24B | OFF | ON | OFF | OFF↔ON |
| OUTPUT SWITCHING MECHANISM 32 | LOW (LEFTWARD MOVEMENT) | HI (RIGHTWARD MOVEMENT) | LOW (LEFTWARD MOVEMENT) | LOW↔HI |
| FORWARD-REVERSE SWITCHING MECHANISM 16 | FORWARD BRAKE | FORWARD BRAKE | REVERSE CLUTCH | FORWARD BRAKE |

CONTINUOUSLY VARIABLE TRANSMISSION

TECHNICAL FIELD

The present invention relates to a continuously variable transmission in which a continuously variable transmission mechanism such as a belt type continuously variable transmission mechanism or a toroidal continuously variable transmission mechanism is combined with a speed-reducing gear and a speed-increasing gear.

BACKGROUND ART

A continuously variable transmission in which a belt type continuously variable transmission mechanism having an endless belt wound around a pair of pulleys and a transmission formed from a gear train having a plurality of meshing gears are combined via a plurality of clutches, and the direction of torque transmission of the belt type continuously variable transmission mechanism is switched between a first direction in which torque is transmitted from one of the pulleys to the other pulley and a second direction in which torque is transmitted from the other pulley to the one pulley so as to enlarge the overall gear ratio is known from Patent Document 1 below.
Patent Document 1: Japanese Patent Publication No. 3-48377

DISCLOSURE OF INVENTION

Problems to be Solved by the Invention

In the conventional arrangement, since the same gear is used for a reduction gear that reduces the input rotational speed to the belt type continuously variable transmission mechanism in a LOW mode and for an induction gear that increases the output rotational speed from the belt type continuously variable transmission mechanism in a HI mode, if the percentage speed increase is increased by reducing the gear ratio of the induction gear in order to reduce the overall gear ratio in the HI mode, the gear ratio of the reduction gear increases, the torque inputted into the belt type continuously variable transmission mechanism in the LOW mode becomes excessively large, and it becomes necessary to increase the strength of the pulley, thus causing the problem that the weight increases.

In order to avoid this, if the gear ratio of the induction gear is increased and the gear ratio of a final gear is decreased, the gear ratio of the final gear in the LOW mode also becomes small, and there is the problem that a sufficient driving force cannot be obtained when starting.

Furthermore, in terms of layout, it is necessary to use a chain drive mechanism in order to carry out alignment in the direction of shaft rotation, and there is the problem that vibration or noise increases or the ease of assembly is degraded.

The present invention has been accomplished in light of the above circumstances, and it is an object thereof to enlarge the overall gear ratio of a continuously variable transmission mechanism.

Means for Solving the Problems

In order to attain the above object, according to a first aspect of the present invention, there is provided a continuously variable transmission comprising a main input shaft into which a driving force from a drive source is inputted, a continuously variable transmission mechanism, a first input path that connects the main input shaft to the continuously variable transmission mechanism, a second input path that connects the main input shaft to the continuously variable transmission mechanism, an input switching mechanism that selectively transmits the driving force from the main input shaft to the first input path or the second input path, a first output path that outputs from the continuously variable transmission mechanism a driving force whose speed has been changed by a predetermined gear ratio, a second output path that outputs from the continuously variable transmission mechanism a driving force whose speed has been changed by a predetermined gear ratio, and an output switching mechanism that selectively transmits the driving force outputted by the continuously variable transmission mechanism to the first output path or the second output path, characterized in that a first speed-reducing gear that decreases the speed of the input into the continuously variable transmission mechanism is disposed in the first input path, a speed-increasing gear that increases the speed of the input into the continuously variable transmission mechanism is disposed in the second input path, a second speed-reducing gear that decreases the speed of the output from the continuously variable transmission mechanism is disposed in the first output path, and a third speed-reducing gear that decreases the speed of the output from the continuously variable transmission mechanism and has a different speed reduction ratio from that of the second speed-reducing gear is disposed in the second output path.

Further, according to a second aspect of the present invention, in addition to the first aspect, the first speed-reducing gear comprises a pair of gears, one gear being capable of being engaged with and disengaged from the main input shaft by means of the input switching mechanism, and the other gear being fixedly provided on a first auxiliary input shaft connected to the continuously variable transmission mechanism, and the speed-increasing gear comprises a pair of gears, one gear being capable of being engaged with and disengaged from the main input shaft by means of the input switching mechanism, and the other gear being fixedly provided on a second auxiliary input shaft connected to the continuously variable transmission mechanism.

Furthermore, according to a third aspect of the present invention, in addition to the first or second aspect, the output switching mechanism is formed from a dog clutch.

Moreover, according to a fourth aspect of the present invention, in addition to the second aspect, the continuously variable transmission mechanism comprises a first pulley provided on the first auxiliary input shaft, a second pulley provided on the second auxiliary input shaft, and an endless belt wound around the first and second pulleys, the main input shaft being disposed in parallel to the first auxiliary input shaft and the second auxiliary input shaft, and the input switching mechanism overlapping the first pulley or the second pulley in an axial direction.

Further, according to a fifth aspect of the present invention, in addition to any one of the second to fourth aspects, the input switching mechanism is disposed in the vicinity of an end part, on the side opposite to the drive source in the axial direction, of the main input shaft, and either one of one gear of the first speed-reducing gear and one gear of the speed-increasing gear is formed from a dog clutch that can be coupled to the main input shaft.

Furthermore, according to a sixth aspect of the present invention, in addition to any one of the second to fourth aspects, the input switching mechanism comprises a first friction clutch disposed in the vicinity of an end part, on the side opposite to the drive source in the axial direction, of the main input shaft, and a second friction clutch disposed in the vicinity of an end part, on the drive source side in the axial direction, of the main input shaft, the first friction clutch being capable of coupling one gear of the first speed-reducing gear to the main input shaft, and the second friction clutch being capable of coupling one gear of the speed-increasing gear to the main input shaft.

Moreover, according to a seventh aspect of the present invention, in addition to the second aspect, the first auxiliary input shaft also functions as a second output shaft, a driving force of the second output shaft being outputted via the second output switching mechanism, and the second auxiliary input shaft also functions as a first output shaft, a driving force of the first output shaft being outputted via the first output switching mechanism and the speed-increasing gear.

Further, according to an eighth aspect of the present invention, in addition to the seventh aspect, the first output switching mechanism is provided on a third output shaft.

Furthermore, according to a ninth aspect of the present invention, in addition to the seventh aspect, the first output switching mechanism is provided on the main input shaft.

Moreover, according to a tenth aspect of the present invention, in addition to the eighth or ninth aspect, a reverse gear is disposed in the first output path.

Further, according to an eleventh aspect of the present invention, in addition to any one of the first to fifth aspects, the main input shaft is divided into a first section on the drive source side and a second section on the forward-reverse switching mechanism side, and the forward-reverse switching mechanism, which comprises a planetary gear mechanism having first to third elements, is disposed between the first and second sections, the first element being connected to the first section, the second element being connected to the second section, the first and second elements being capable of being coupled to each other via a clutch, and the third element being capable of being coupled to a casing via a brake.

Furthermore, according to a twelfth aspect of the present invention, in addition to the first aspect, the continuously variable transmission mechanism comprises an input disk, an output disk, and a power roller held between the input disk and the output disk, the first input path transmitting the driving force from the drive source to one of the input disk and the output disk and the second input path transmitting the driving force from the drive source to the other of the input disk and the output disk, and when the driving force of the drive source is inputted into the first input path, the second input path functions as the first output path, and when the driving force of the drive source is inputted into the second input path, the first input path functions as the second output path.

It should be noted here that an engine E of an embodiment corresponds to the drive source of the present invention, a first auxiliary input shaft 14 of the embodiment corresponds to the second output shaft of the present invention, a second auxiliary input shaft 15 of the embodiment corresponds to the first output shaft of the present invention, a forward clutch 17 of the embodiment corresponds to the clutch of the present invention, a reverse brake 18 of the embodiment corresponds to the brake of the present invention, a belt type continuously variable transmission mechanism 20 and a toroidal continuously variable transmission mechanism 20' of the embodiment correspond to the continuously variable transmission mechanism of the present invention, a LOW friction clutch 24A of the embodiment corresponds to the first friction clutch of the present invention, a HI friction clutch 24B of the embodiment corresponds to the second clutch of the present invention, first and second reduction gears 25 and 26 of the embodiment correspond to the first speed-reducing gear of the present invention, first and second induction gears 27 and 28 of the embodiment correspond to the speed-increasing gear of the present invention, a second final drive gear 29 of the embodiment corresponds to the third speed-reducing gear of the present invention, a first final drive gear 31 of the embodiment corresponds to the second speed-reducing gear of the present invention, first and second output switching mechanisms 32 and 30 of the embodiment correspond to the output switching mechanism of the present invention, a final driven gear 34 of the embodiment corresponds to the second speed-reducing gear or the third speed-reducing gear of the present invention, and a reverse drive gear 42, a reverse driven gear 43, and a reverse idle gear 44 of the embodiment correspond to the reverse gear of the present invention.

Effects of the Invention

In accordance with the first aspect of the present invention, the driving force from the drive source is transmitted in the sequence: main input shaft → input switching mechanism → first input path in which first speed-reducing gear is disposed → continuously variable transmission mechanism → output switching mechanism → first output path in which second speed-reducing gear is disposed, thus establishing a LOW mode, and is transmitted in the sequence: main input shaft → input switching mechanism → second input path in which speed-increasing gear is disposed → continuously variable transmission mechanism → output switching mechanism → second output path in which third speed-reducing gear is disposed, thus establishing a HI mode. Since the first to third speed-reducing gears and the speed-increasing gear are independent from each other, the degree of freedom in setting the rotational speed inputted into the continuously variable transmission mechanism in the LOW mode and the rotational speed inputted into the continuously variable transmission mechanism in the HI mode can be increased, and not only is it possible to sufficiently enlarge the overall gear ratio of the continuously variable transmission, but it is also possible to reduce the input gear ratio for the continuously variable transmission mechanism in the LOW mode, thus reducing the input torque to the continuously variable transmission mechanism to thereby enhance the durability of the continuously variable transmission mechanism, or to reduce the gear ratio in the HI mode, thus reducing the rotational speed of the drive source to thereby cut the fuel consumption.

Furthermore, in accordance with the second aspect of the present invention, since the first speed-reducing gear is formed from a pair of gears, one gear being capable of being engaged with and disengaged from the main input shaft by means of the input switching mechanism, and the other gear being fixedly provided on the first auxiliary input shaft connected to the continuously variable transmission mechanism, and the speed-increasing gear is formed from a pair of gears, one gear being capable of being engaged with and disengaged from the main input shaft by means of the input switching mechanism, and the other gear being fixedly provided on the second auxiliary input shaft connected to the continuously variable transmission mechanism, it is possible by means of the input switching mechanism to reduce the speed of rotation of the main input shaft and transmit it to the first auxiliary input shaft, or increase the speed of rotation of the main input shaft and transmit it to the second auxiliary input shaft. Moreover, since both the first speed-reducing gear and the speed-increasing gear are formed from pairs of gears, it is possible to prevent the rotational direction of the first and second auxiliary input shafts from being reversed between that when the speed is being reduced and that when the speed is being increased, and it becomes unnecessary to employ a chain drive mechanism for making the directions of rotation coincide with each other, thus simplifying the structure.

Furthermore, in accordance with the third aspect of the present invention, since the output switching mechanism is formed from a dog clutch, it is possible to reduce the drag resistance compared with a case in which a friction clutch is used.

Moreover, in accordance with the fourth aspect of the present invention, since the continuously variable transmission mechanism includes the first pulley provided on the first auxiliary input shaft, the second pulley provided on the second auxiliary input shaft, and the endless belt wound around the first and second pulleys, the main input shaft is disposed in parallel to the first auxiliary input shaft and the second auxiliary input shaft, and the input switching mechanism overlaps the first pulley or the second pulley in the axial direction, it is possible to utilize the dead space between the first pulley and the second pulley effectively to lay out the main input shaft, the input switching mechanism, and the continuously variable transmission mechanism without them interfering with each other.

Furthermore, in accordance with the fifth aspect of the present invention, since the input switching mechanism is disposed in the vicinity of an end part, on the side opposite to the drive source in the axial direction, of the main input shaft, and the input switching mechanism is formed from a dog clutch that can couple either one of one gear of the first speed-reducing gear and one gear of the speed-increasing gear to the main input shaft, it is possible not only to reduce the drag resistance but also to simplify the structure by using only one actuator compared with a case in which a friction clutch is used.

Moreover, in accordance with the sixth aspect of the present invention, since the input switching mechanism includes the first friction clutch disposed in the vicinity of an end part, on the side opposite to the drive source in the axial direction, of the main input shaft, and the second friction clutch disposed in the vicinity of an end part, on the drive source side in the axial direction, of the main input shaft, it is possible to establish the LOW mode by coupling one gear of the first speed-reducing gear to the main input shaft by means of the first friction clutch and to establish the HI mode by coupling one gear of the speed-increasing gear to the main input shaft by means of the second friction clutch.

Furthermore, in accordance with the seventh aspect of the present invention, since the first auxiliary input shaft functions also as the second output shaft, the driving force of the second output shaft being outputted via the second output switching mechanism, and the second auxiliary input shaft functions also as the first output shaft, the driving force of the first output shaft being outputted via the first output switching mechanism and the speed-increasing gear, it is possible to enlarge the overall gear ratio toward the LOW side by making the speed-increasing gear function as the first speed-reducing gear in the LOW mode without increasing the diameter of the final driven gear.

Moreover, in accordance with the eighth aspect of the present invention, since the first output switching mechanism is provided on the third output shaft, compared with a case in which the first output switching mechanism is provided on the first output shaft or the main input shaft, the continuously variable transmission can be reduced in the dimension in the axial direction.

Furthermore, in accordance with the ninth aspect of the present invention, since the first output switching mechanism is provided on the main input shaft, it is possible to arrange the first output switching mechanism by utilizing the dead space between the first and second pulleys, thus reducing the dimension in the radial direction of the continuously variable transmission.

Moreover, in accordance with the tenth aspect of the present invention, since the reverse gear is disposed in the first output path, it is possible to make the vehicle travel backward by reversing the rotation of the first output shaft via the reverse gear.

Furthermore, in accordance with the eleventh aspect of the present invention, since the main input shaft is divided into the first section on the drive source side and the second section on the forward-reverse switching mechanism side, the forward-reverse switching mechanism comprising a planetary gear mechanism having first to third elements is disposed between the first and second sections, the first element is connected to the first section, the second element is connected to the second section, the first and second elements can be coupled to each other via a clutch, and the third element can be coupled to the casing via the brake, it is possible to make the vehicle travel forward by engaging the clutch to thus rotate the first and second sections in the same direction, and it is possible to make the vehicle travel backward by engaging the brake to thus rotate the first and second sections in opposite directions.

Moreover, in accordance with the twelfth aspect of the present invention, since the continuously variable transmission mechanism includes the input disk, the output disk, and the power roller held between the input disk and the output disk, and the driving force can be inputted either from the input disk side or the output disk side and changed in speed, it is possible to output the driving force using the second input path, which serves as the first output path, from the first input path via the continuously variable transmission mechanism, or output the driving force of the drive source using the first input path, which serves as the second output path, from the second input path via the continuously variable transmission mechanism.

BRIEF DESCRIPTION OF DRAWINGS

FIG. 21 is a table of engagement of an input switching mechanism, first and second output switching mechanisms, and a forward-reverse switching mechanism. (third embodiment)

FIG. 24 is a table of engagement of an input switching mechanism, an output switching mechanism, and a forward-reverse switching mechanism. (fifth embodiment)

EXPLANATION OF REFERENCE NUMERALS AND SYMBOLS

Figure 1:
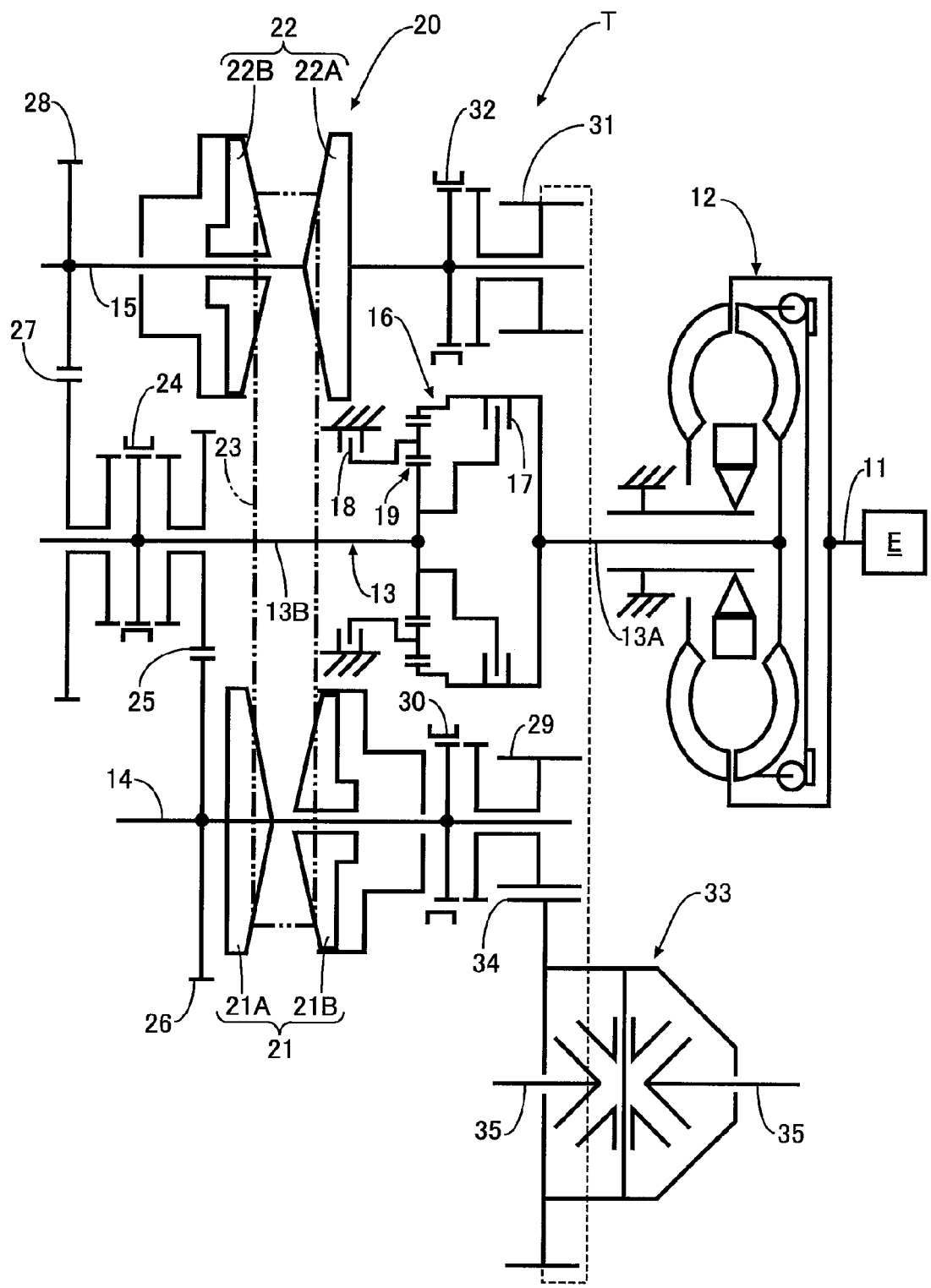
FIG. 1 is a skeleton diagram of a continuously variable transmission. (first embodiment)

E Engine (drive source)
13 Main input shaft
13A First section
13B Second section
14 First auxiliary input shaft (second output shaft)
15 Second auxiliary input shaft (first output shaft)
16 Forward-reverse switching mechanism
17 Forward clutch (clutch)
18 Reverse brake (brake)
20 Belt type continuously variable transmission mechanism (continuously variable transmission mechanism)
20' Toroidal continuously variable transmission mechanism (continuously variable transmission mechanism)
21 First pulley
22 Second pulley
23 Endless belt
24 Input switching mechanism
24A LOW friction clutch (first clutch)
24B HI friction clutch (second clutch)
25 First reduction gear (first speed-reducing gear)
26 Second reduction gear (first speed-reducing gear)
27 First induction gear (speed-increasing gear)
28 Second induction gear (speed-increasing gear)
29 Second final drive gear (third speed-reducing gear)
30 Second output switching mechanism (output switching mechanism)
31 First final drive gear (second speed-reducing gear)
32 First output switching mechanism (output switching mechanism)
34 Final driven gear (second speed-reducing gear, third speed-reducing gear)
42 Reverse drive gear (reverse gear)
43 Reverse driven gear (reverse gear)
44 Reverse idle (reverse gear)
45 Third output shaft
49 Input disk
50 Output disk
51 Power roller
56 Output switching mechanism

BEST MODE FOR CARRYING OUT THE INVENTION

Modes for carrying out the present invention are explained below by reference to the attached drawings.

First Embodiment

A first embodiment of the present invention is now explained by reference to FIG. 1 to FIG. 11.

As shown in FIG. 1, a continuously variable transmission T mounted on a vehicle includes a main input shaft 13 connected to a crankshaft 11 of an engine E via a torque converter 12, and a first auxiliary input shaft 14 and a second auxiliary input shaft 15 disposed in parallel to the main input shaft 13. The main input shaft 13 is divided into two, that is, a first section 13A and a second section 13B, and a forward-reverse switching mechanism 16 is disposed between the first and second sections 13A and 13B. The first auxiliary input shaft 14 forms the second output shaft of the present invention, and the second auxiliary input shaft 15 forms the first output shaft of the present invention.

The forward-reverse switching mechanism 16 includes a forward clutch 17, a reverse brake 18, and a planetary gear mechanism 19. A ring gear, which is a first element of the planetary gear mechanism 19, is connected to the first section 13A, a sun gear, which is a second element of the planetary gear mechanism 19, is connected to the second section 13B, a carrier, which is a third element of the planetary gear mechanism 19, can be coupled to a casing via the reverse brake 18, and the ring gear and the sun gear can be coupled to each other via the forward clutch 17. Therefore, when the forward clutch 17 is engaged, the first section 13A and the second section 13B of the main input shaft 13 are directly coupled and the vehicle travels forward, and when the reverse brake 18 is engaged, rotation of the first section 13A of the main input shaft 13 is reversed by the planetary gear mechanism 19, reduced in speed, and transmitted to the second section 13B of the main input shaft 13, and the vehicle travels backward.

A belt type continuously variable transmission mechanism 20 disposed between the first auxiliary input shaft 14 and the second auxiliary input shaft 15 includes a first pulley 21 provided on the first auxiliary input shaft 14, a second pulley 22 provided on the second auxiliary input shaft 15, and an endless belt 23 wound around the first and second pulleys 21 and 22. Groove widths of the first and second pulleys 21 and 22 are increased and decreased in opposite directions to each other by means of oil pressure, thus continuously changing the gear ratio between the first auxiliary input shaft 14 and the second auxiliary input shaft 15. The first pulley 21 is formed from a first fixed pulley 21A that is fixed to the first auxiliary input shaft 14, and a first movable pulley 21B that can move closer to and further away from the first fixed pulley 21A. The second pulley 22 is formed from a second fixed pulley 22A that is fixed to the second auxiliary input shaft 15, and a second movable pulley 22B that can move closer to and further away from the second fixed pulley 22A.

An input switching mechanism 24 formed from a dog clutch is provided on the second section 13B of the main input shaft 13. A first reduction gear 25 and a first induction gear 27 are relatively rotatably supported on the first section 13A of the main input shaft 13; when a sleeve of the input switching mechanism 24 is moved rightward from a neutral position the first reduction gear 25 is coupled to the second section 13B of the main input shaft 13, and when the sleeve of the input switching mechanism 24 is moved leftward from the neutral position the first induction gear 27 is coupled to the second section 13B of the main input shaft 13. A second reduction gear 26 meshing with the first reduction gear 25 is fixedly provided on the first auxiliary input shaft 14, and a second induction gear 28 meshing with the first induction gear 27 is fixedly provided on the second auxiliary input shaft 15.

A second final drive gear 29 is relatively rotatably supported on the first auxiliary input shaft 14, and this second final drive gear 29 can be coupled to the first auxiliary input shaft 14 by means of a second output switching mechanism 30. A first final drive gear 31 is relatively rotatably supported on the second auxiliary input shaft 15, and this first final drive gear 31 can be coupled to the second auxiliary input shaft 15 by means of a first output switching mechanism 32. The first and second final drive gears 31 and 29 mesh with a final driven gear 34 of a differential gear 33, and left and right driven wheels are connected to drive shafts 35 and 35 extending to the left and right from the differential gear 33.

The first and second reduction gears 25 and 26 reduce the speed of rotation of the first section 13A of the main input shaft 13 and transmit it to the first auxiliary input shaft 14. On the other hand, the first and second induction gears 27 and 28 increase the speed of rotation of the first section 13A of the main input shaft 13 and transmit it to the second auxiliary input shaft 15.

When the gear ratio from the first reduction gear 25 to the second reduction gear 26 is $i_{red}$, the gear ratio from the first induction gear 27 to the second induction gear 28 is $i_{ind}$, and the minimum gear ratio from the first pulley 21 to the second pulley 22 of the belt type continuously variable transmission mechanism 20 is $i_{min}$, the gear ratios are set so that $i_{red} \times i_{min} = i_{ind}$. Furthermore, when the gear ratio from the first final drive gear 31 to the final driven gear 34 is $i_{loF}$, and the gear ratio from the second final drive gear 29 to the final driven gear 34 is $i_{hiF}$, the gear ratios are set so that $i_{loF} \times i_{min} i_{hiF}$.

Figure 2:
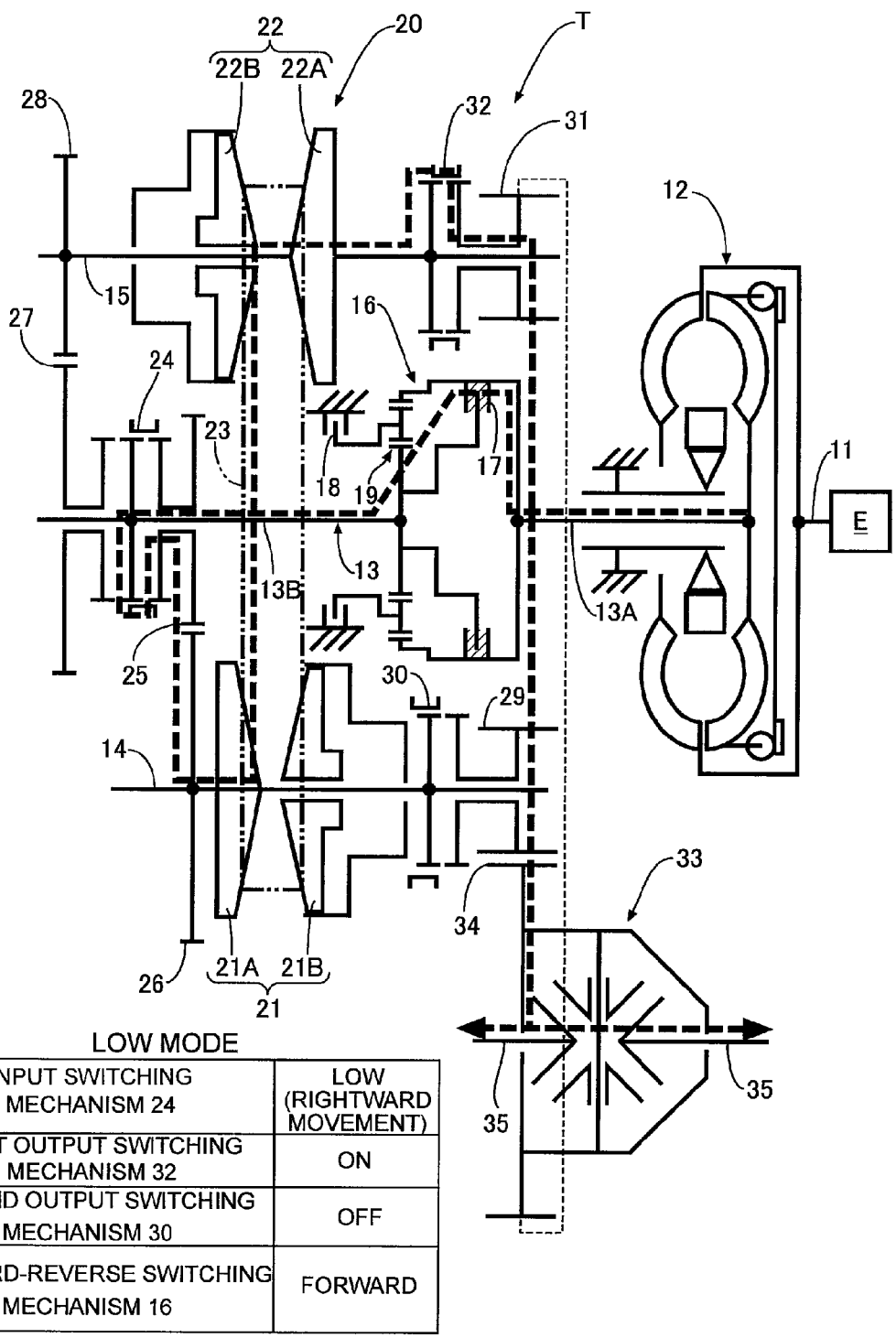
FIG. 2 is a torque flow diagram of a LOW mode. (first embodiment)

FIG. 2 shows a LOW mode of the continuously variable transmission T. In the LOW mode, the input switching mechanism 24 is switched to the LOW side (rightward movement), the first output switching mechanism 32 is engaged, the second output switching mechanism 30 is disengaged, and the forward-reverse switching mechanism 16 is switched to the forward side (forward clutch 17 engagement).

As a result, the driving force of the engine E is transmitted to the driven wheels via the path: crankshaft 11 → torque converter 12 → first section 13A of main input shaft 13 → forward-reverse switching mechanism 16 → second section 13B of main input shaft 13 → input switching mechanism 24 → first reduction gear 25 → second reduction gear 26 → first auxiliary input shaft 14 → first pulley 21 → endless belt 23 → second pulley 22 → second auxiliary input shaft 15 → first output switching mechanism 32 → first final drive gear 31 → final driven gear 34 → differential gear 33 → drive shafts 35 and 35.

In the LOW mode, the belt type continuously variable transmission mechanism 20 transmits the driving force from the first auxiliary input shaft 14 side to the second auxiliary input shaft 15 side, and according to this change in gear ratio the overall gear ratio of the continuously variable transmission T is changed.

Figure 3:
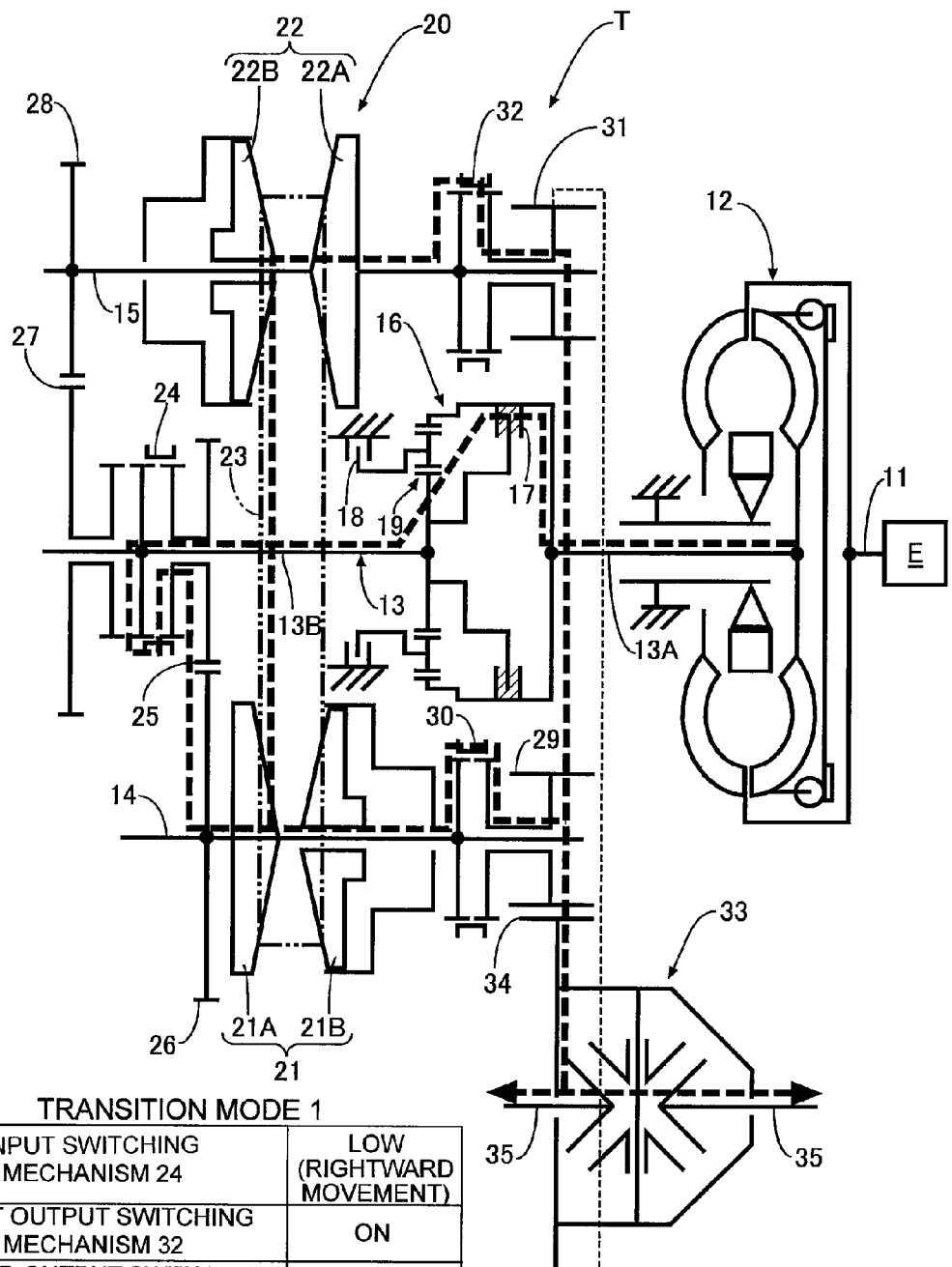
FIG. 3 is a torque flow diagram of a transition mode 1. (first embodiment)

FIG. 3 shows a transition mode 1, which is the first half of a transition from the LOW mode to a HI mode, which is described later. In the transition mode 1, the input switching mechanism 24 is switched to the LOW side (rightward movement), the first output switching mechanism 32 is engaged, the second output switching mechanism 30 is engaged, the forward-reverse switching mechanism 16 is switched to the forward side (forward clutch 17 engagement), and the LOW mode, which is described above, and a directly coupled LOW mode (see FIG. 7), which is described later, are simultaneously established.

Figure 4:
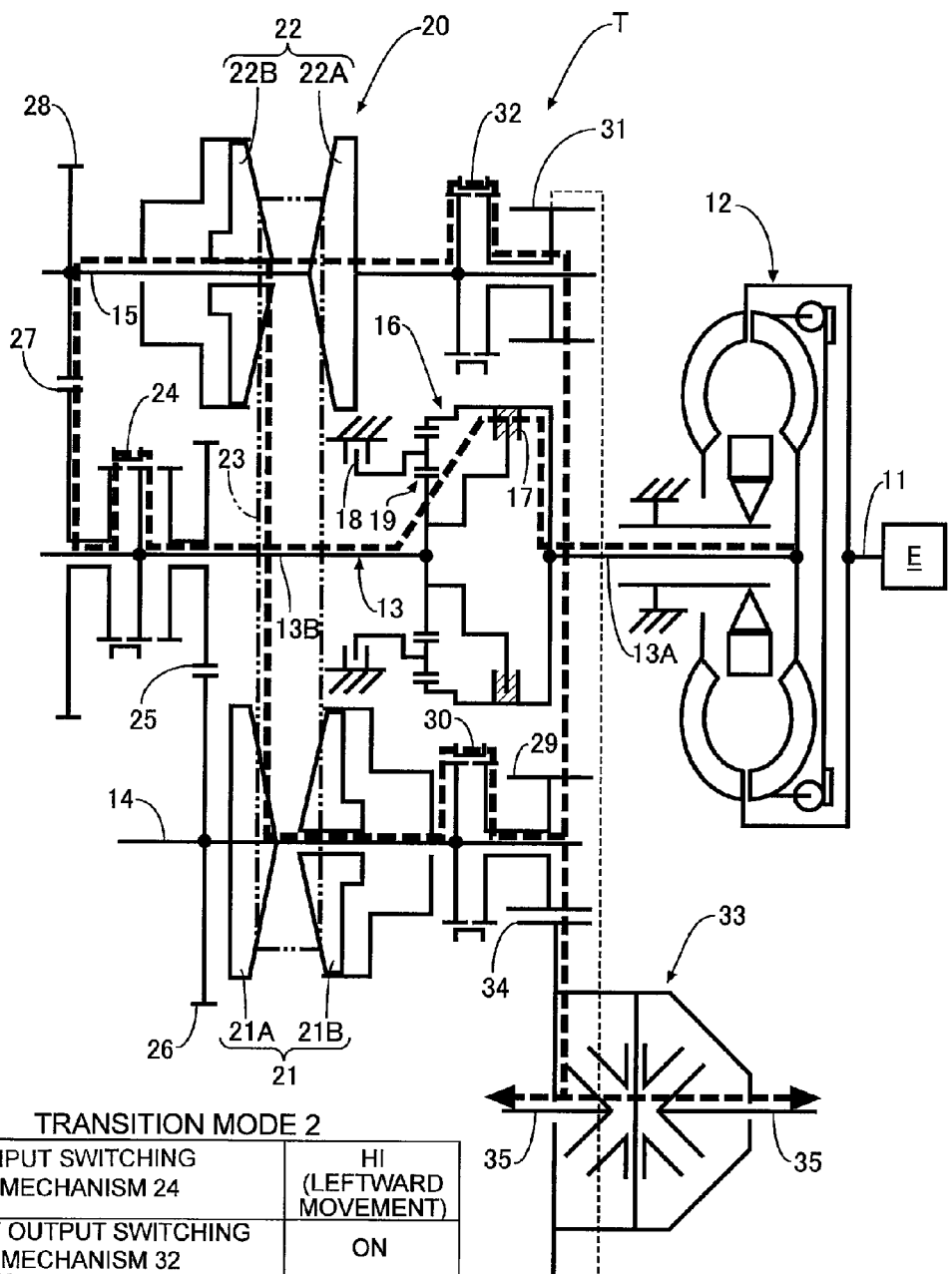
FIG. 4 is a torque flow diagram of a transition mode 2. (first embodiment)

FIG. 4 shows a transition mode 2, which is the second half of the transition from the LOW mode to the HI mode, which is described later. In the transition mode 2, the input switching mechanism 24 is switched to the HI side (leftward movement), the first output switching mechanism 32 is engaged, the second output switching mechanism 30 is engaged, the forward-reverse switching mechanism 16 is switched to the forward side (forward clutch 17 engagement), and the HI mode (see FIG. 5), which is described later, and a directly coupled HI mode (see FIG. 8), which is described later, are simultaneously established.

The transition mode 1 and the transition mode 2 are for carrying out the transition from the LOW mode to the HI mode smoothly, and details thereof are given later.

Figure 5:
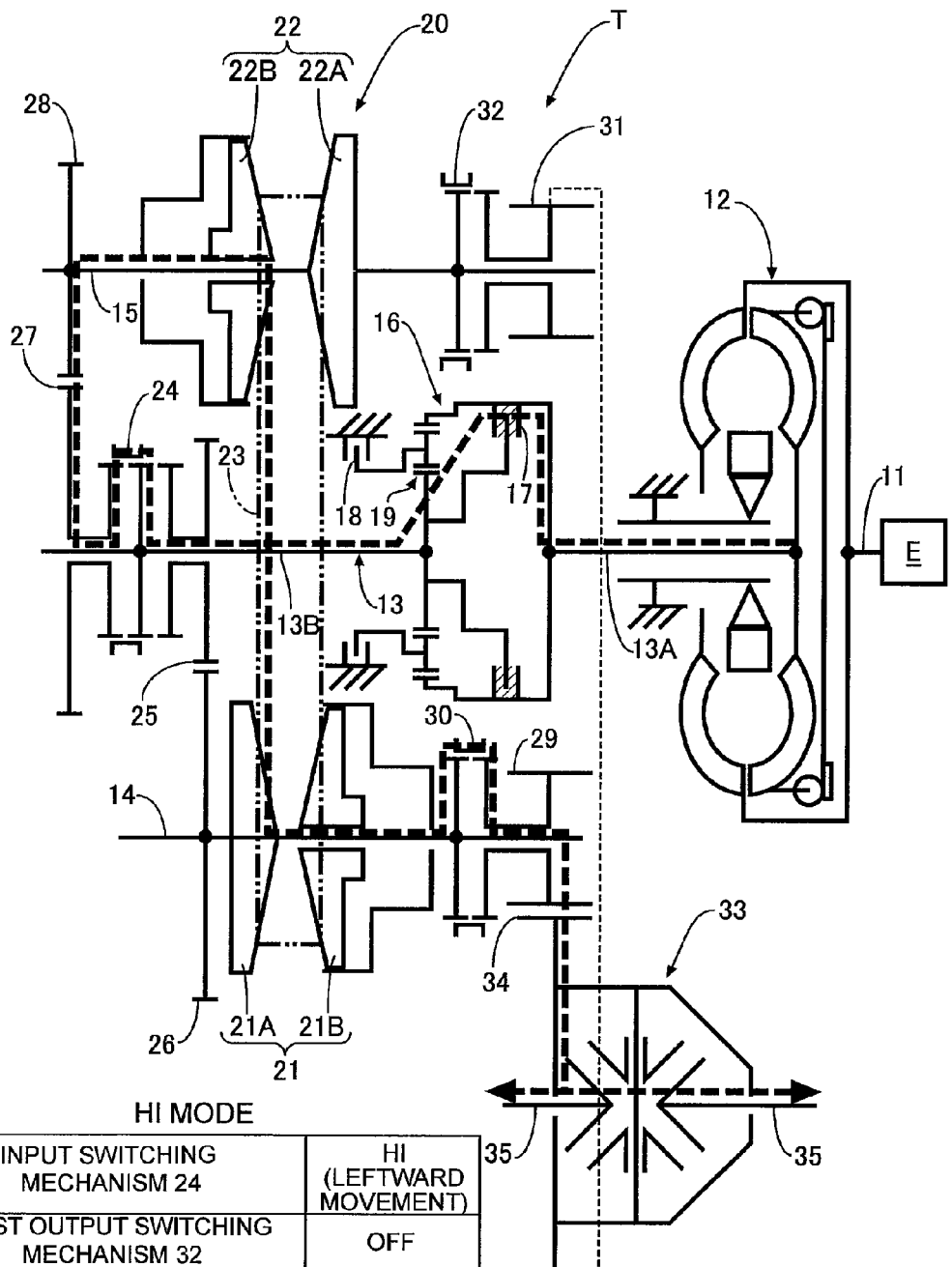
FIG. 5 is a torque flow diagram of a HI mode. (first embodiment)

FIG. 5 shows the HI mode of the continuously variable transmission T. In the HI mode, the input switching mechanism 24 is switched to the HI side (leftward movement), the first output switching mechanism 32 is disengaged, the second output switching mechanism 30 is engaged, and the forward-reverse switching mechanism 16 is switched to the forward side (forward clutch 17 engagement).

As a result, the driving force of the engine E is transmitted to the driven wheels via the path: crankshaft 11 → torque converter 12 → first section 13A of main input shaft 13 → forward-reverse switching mechanism 16 → second section 13B of main input shaft 13 → input switching mechanism 24 → first induction gear 27 → second induction gear 28 → second auxiliary input shaft 15 → second pulley 22 → endless belt 23 → first pulley 21 → first auxiliary input shaft 14 → second output switching mechanism 30 → second final drive gear 29 → final driven gear 34 → differential gear 33 → drive shafts 35 and 35.

In the HI mode, the belt type continuously variable transmission mechanism 20 transmits the driving force from the second auxiliary input shaft 15 side to the first auxiliary input shaft 14 side, and according to this change in gear ratio the overall gear ratio of the continuously variable transmission T is changed.

Figure 6:
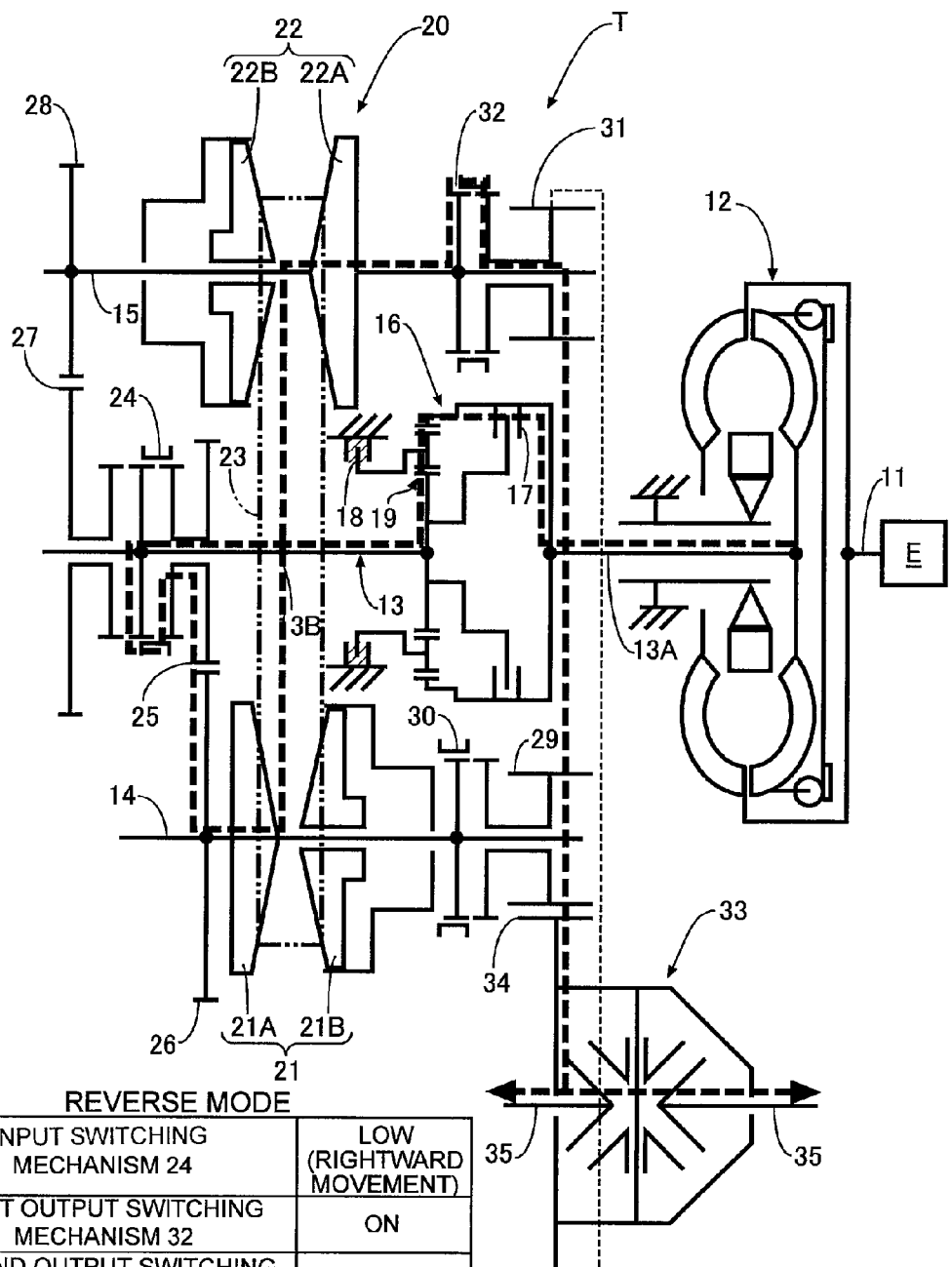
FIG. 6 is a torque flow diagram of a reverse mode. (first embodiment)

FIG. 6 shows a reverse mode of the continuously variable transmission T. In the reverse mode, the input switching mechanism 24 is switched to the LOW side (rightward movement), the first output switching mechanism 32 is engaged, the second output switching mechanism 30 is disengaged, and the forward-reverse switching mechanism 16 is switched to the reverse side (reverse brake 18 engagement).

As a result, the driving force of the engine E is transmitted as reverse rotation to the driven wheels via the path: crankshaft 11 → torque converter 12 → first section 13A of main input shaft 13 → forward-reverse switching mechanism 16 → second section 13B of main input shaft 13 → input switching mechanism 24 → first reduction gear 25 → second reduction gear 26 → first auxiliary input shaft 14 → first pulley 21 → endless belt 23 → second pulley 22 → second auxiliary input shaft 15 → first output switching mechanism 32 → first final drive gear 31 → final driven gear 34 → differential gear 33 → drive shafts 35 and 35.

In the reverse mode, the belt type continuously variable transmission mechanism 20 transmits the driving force from the first auxiliary input shaft 14 side to the second auxiliary input shaft 15 side, and according to this change in gear ratio the overall gear ratio of the continuously variable transmission T is changed.

Figure 7:
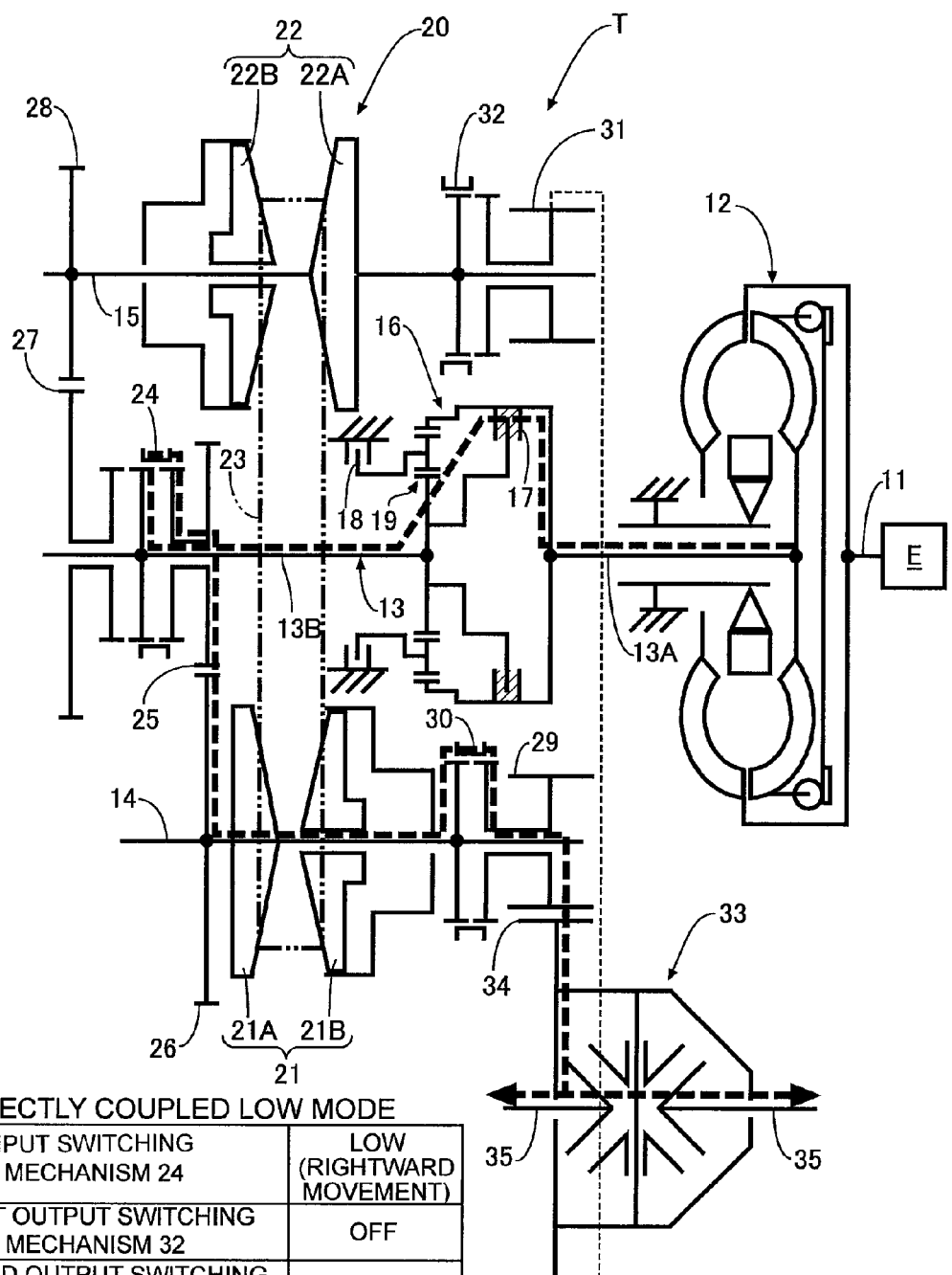
FIG. 7 is a torque flow diagram of a directly coupled LOW mode. (first embodiment)

FIG. 7 shows the directly coupled LOW mode of the continuously variable transmission T. In the directly coupled LOW mode, the input switching mechanism 24 is switched to the LOW side (rightward movement), the first output switching mechanism 32 is disengaged, the second output switching mechanism 30 is engaged, and the forward-reverse switching mechanism 16 is switched to the forward side (forward clutch 17 engagement).

As a result, the driving force of the engine E is transmitted to the driven wheels via the path: crankshaft 11 → torque converter 12 → first section 13A of main input shaft 13 → forward-reverse switching mechanism 16 → second section 13B of main input shaft 13 → input switching mechanism 24 → first reduction gear 25 → second reduction gear 26 → first auxiliary input shaft 14 → second output switching mechanism 30 → second final drive gear 29 → final driven gear 34 → differential gear 33 → drive shafts 35 and 35.

In the directly coupled LOW mode, the belt type continuously variable transmission mechanism 20 is not actuated, and the overall gear ratio of the continuously variable transmission T is constant.

Figure 8:
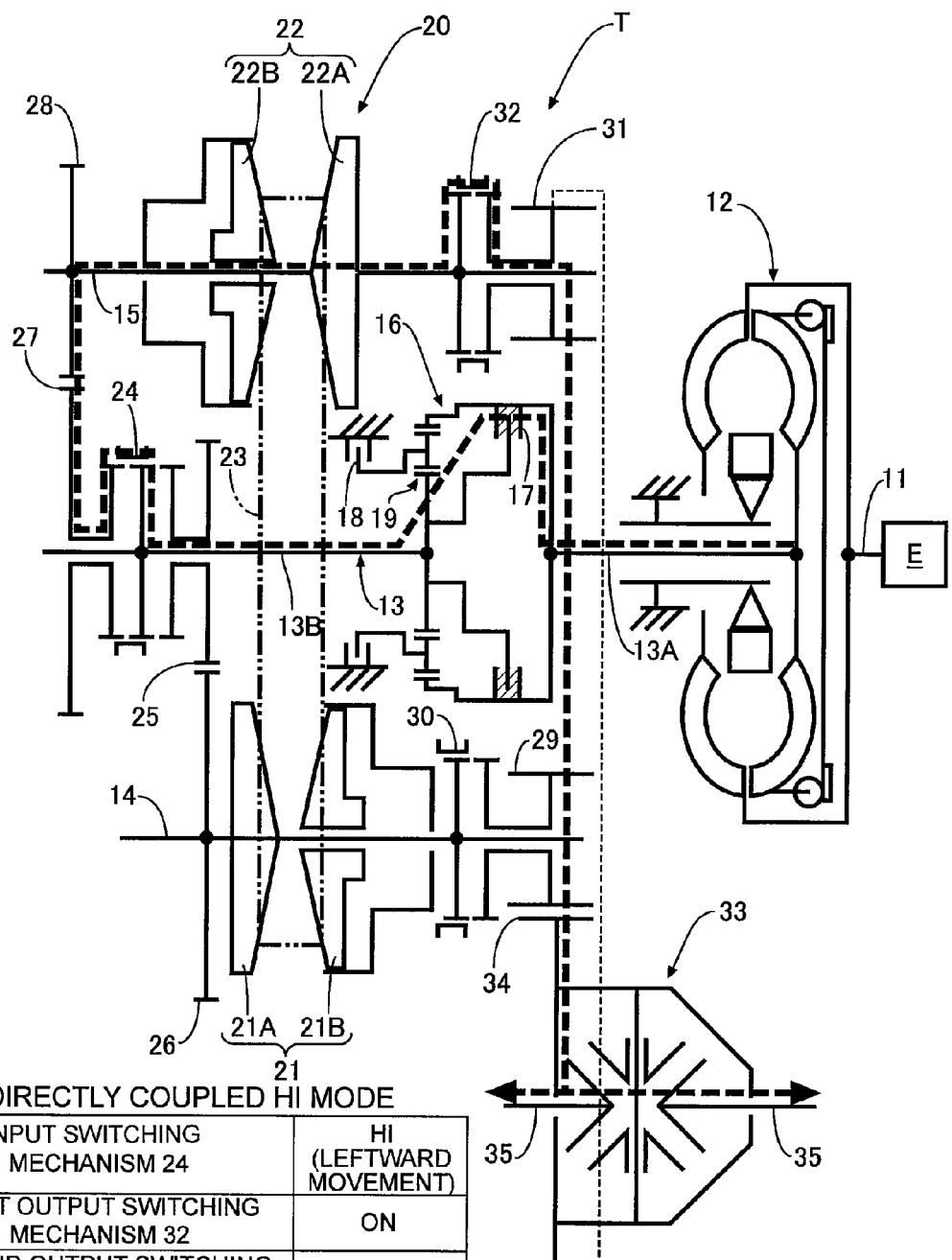
FIG. 8 is a torque flow diagram of a directly coupled HI mode. (first embodiment)

FIG. 8 shows the directly coupled HI mode of the continuously variable transmission T. In the directly coupled HI mode, the input switching mechanism 24 is switched to the HI side (leftward movement), the first output switching mechanism 32 is engaged, the second output switching mechanism 30 is disengaged, and the forward-reverse switching mechanism 16 is switched to the forward side (forward clutch 17 engagement).

As a result, the driving force of the engine E is transmitted to the driven wheels via the path: crankshaft 11 → torque converter 12 → first section 13A of main input shaft 13 → forward-reverse switching mechanism 16 → second section 13B of main input shaft 13 → input switching mechanism 24 → first induction gear 27 → second induction gear 28 → second auxiliary input shaft 15 → first output switching mechanism 32 → first final drive gear 31 → final driven gear 34 → differential gear 33 → drive shafts 35 and 35.

In the directly coupled HI mode, the belt type continuously variable transmission mechanism 20 is not actuated, and the overall gear ratio of the continuously variable transmission T is constant.

The operation at the time of transition from the LOW mode to the HI mode is now explained.

Figure 9:
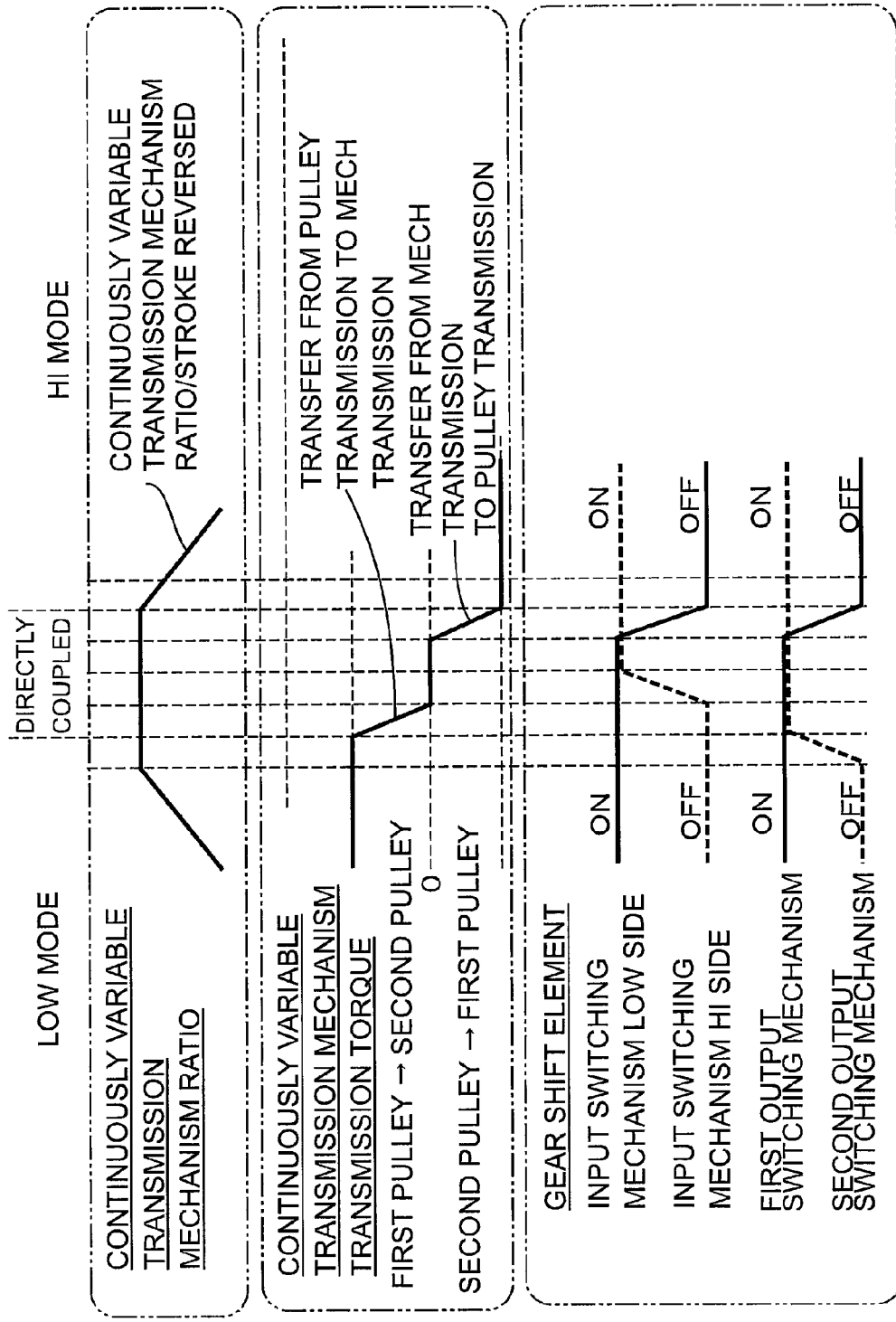
FIG. 9 is a diagram for explaining a transition between the LOW mode and the HI mode. (first embodiment)

As shown in FIG. 9, in the LOW mode shown in FIG. 2, when the gear ratio from the first pulley 21 to the second pulley 22 of the belt type continuously variable transmission mechanism 20 gradually decreases and attains the minimum gear ratio $i_{min}$, the second output switching mechanism 30, which has been disengaged up until then, is engaged, and the transition mode 1 shown in FIG. 3 is thus attained. Subsequently, after the input switching mechanism 24 is switched from the LOW side to the HI side to thus attain the transition mode 2 shown in FIG. 4, the first output switching mechanism 32, which has been engaged up until then, is disengaged, and the HI mode shown in FIG. 5 is thus attained.

At the end of the LOW mode and the beginning of the HI mode, the overall gear ratio of the continuously variable transmission T is the same, thereby preventing the occurrence of gear shift shock when switching from the LOW mode to the HI mode. When the second output switching mechanism 30 is engaged at the time of transition from the LOW mode to the transition mode 1, when the input switching mechanism 24 is switched from the LOW side to the HI side at the time of transition from the transition mode 1 to the transition mode 2, and when the first output switching mechanism 32 is disengaged at the time of transition from the transition mode 2 to the HI mode, smooth actuation of the input switching mechanism 24, the first output switching mechanism 32, and the second output switching mechanism 30 is enabled by preventing the occurrence of differential rotation.

In order to explain this in detail, it is assumed that the gear ratio $i_{red}$ from the first reduction gear 25 to the second reduction gear 26 is 1.5, the gear ratio $i_{ind}$ from the first induction gear 27 to the second induction gear 28 is 0.75, the minimum gear ratio $i_{min}$ from the first pulley 21 of the belt type continuously variable transmission mechanism 20 to the second pulley 22 is 0.5, the gear ratio $i_{loF}$ from the first final drive gear 31 to the final driven gear 34 is 4.0, the gear ratio $i_{hiF}$ from the second final drive gear 29 to the final driven gear 34 is 2.0, and the rotational speed of the main input shaft 13 is 1500 rpm.

In the power transmission path of the transition mode 1, the power transmission path of the LOW mode and the power transmission path of the directly coupled LOW mode coexist, but in the power transmission path of the LOW mode, when the main input shaft 13 rotates at 1500 rpm, the first auxiliary input shaft 14 is reduced in speed by means of the first and second reduction gears 25 and 26 at $i_{red}$=1.5 to become 1000 rpm, the second auxiliary input shaft 15 is increased in speed by means of the belt type continuously variable transmission mechanism 20 at $i_{min}$=0.5 to become 2000 rpm, and the final driven gear 34 is reduced in speed by means of the first final drive gear 31 at $i_{loF}$=4.0 and rotates at 500 rpm. On the other hand, in the power transmission path of the directly coupled LOW mode, when the main input shaft 13 rotates at 1500 rpm, the first auxiliary input shaft 14 is reduced in speed by means of the first and second reduction gears 25 and 26 at $i_{red}$=1.5 to become 1000 rpm, and the final driven gear 34 is reduced in speed by means of the second final drive gear 29 at $i_{hiF}$=2.0 and rotates at 500 rpm.

In the power transmission path of the transition mode 2, the power transmission path of the HI mode and the power transmission path of the directly coupled HI coexist, but in the power transmission path of the HI mode, when the main input shaft 13 rotates at 1500 rpm, the second auxiliary input shaft 15 is increased in speed by means of the first and second induction gears 27 and 28 at $i_{ind}$=0.75 to become 2000 rpm, the first auxiliary input shaft 14 is reduced in speed by means of the belt type continuously variable transmission mechanism 20 at $1/i_{min}$=2.0 to become 1000 rpm, and the final driven gear 34 is reduced in speed by means of the second final drive gear 29 at $i_{hiF}$=2.0 and rotates at 500 rpm. On the other hand, in the power transmission path of the directly coupled HI mode, when the main input shaft 13 rotates at 1500 rpm, the second auxiliary input shaft 15 is increased in speed by means of the first and second induction gears 27 and 28 at $i_{ind}$=0.75 to become 2000 rpm, and the final driven gear 34 is reduced in speed by means of the first final drive gear 31 at $i_{oF}$=4.0 and rotates at 500 rpm.

As described above, when there is shift between the LOW mode, the transition mode 1, the transition mode 2, and the HI mode, since the rotational speeds of the main input shaft 13, the first auxiliary input shaft 14, the second auxiliary input shaft 15, and the final driven gear 34 do not change at all, and the gear ratio of the belt type continuously variable transmission mechanism 20 is also maintained at $i_{min}$, it is possible to actuate the input switching mechanism 24, the first output switching mechanism 32, and the second output switching mechanism 30 smoothly without differential rotation.

Furthermore, at the time of transition from the transition mode 1 to the transition mode 2, since the belt type continuously variable transmission mechanism 20 switches from the power transmission state of first pulley 21 → second pulley 22 to the power transmission state of second pulley 22 → first pulley 21, there is an instant at which torque transmission is temporarily cut off. However, since at that instant the directly coupled LOW mode and the directly coupled HI mode are established to thus transmit torque, it is possible to prevent the occurrence of shock due to discontinuous transmission of torque.

Figure 10:
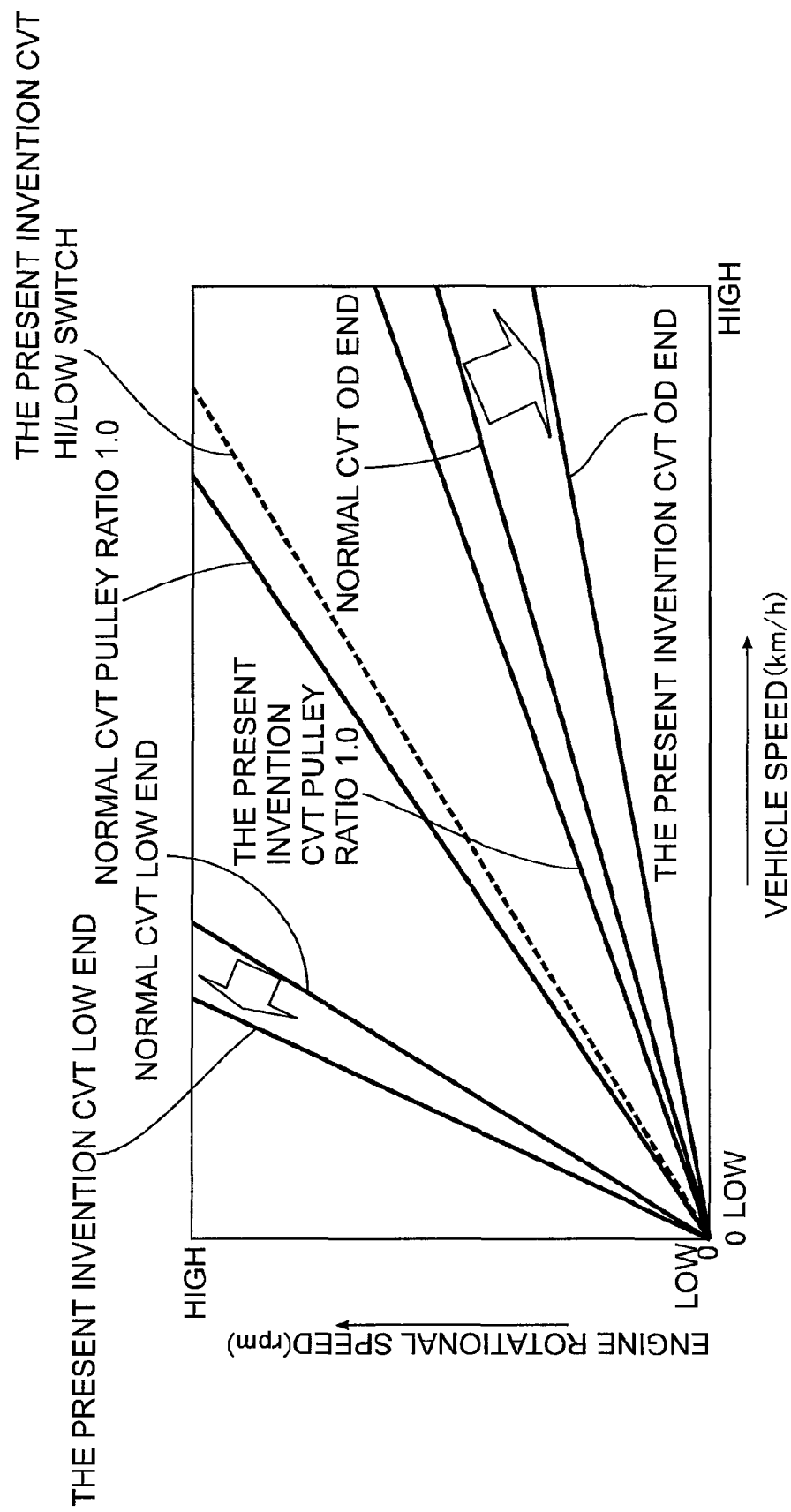
FIG. 10 is a diagram showing the relationship between gear ratio of the continuously variable transmission mechanism and overall gear ratio. (first embodiment)
Figure 11:
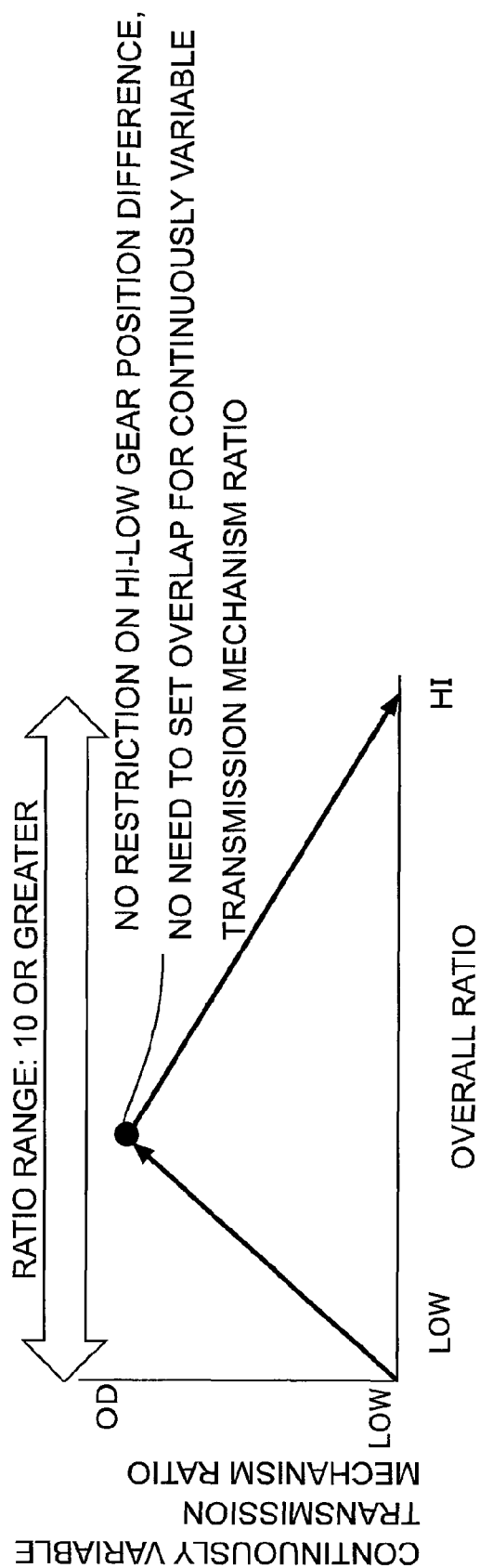
FIG. 11 is a diagram for explaining the difference in overall gear ratio between the invention of the present application and a Comparative Example. (first embodiment)

As hereinbefore described, in accordance with the present embodiment, due to combination of the belt type continuously variable transmission mechanism 20 with the speed-reducing gear formed from the first and second reduction gears 25 and 26 and the speed-increasing gear formed from the first and second induction gears 27 and 28, as shown in FIG. 10, compared with a belt type continuously variable transmission mechanism (overall gear ratio=on the order of 6 to 7) on its own, it is possible to enlarge both the gear ratio of the LOW side and the gear ratio of the OD side to thus achieve a large overall gear ratio of 10 or greater (see FIG. 11). Furthermore, in the continuously variable transmission T of the present embodiment, the overall gear ratio when the gear ratio of the belt type continuously variable transmission mechanism 20 is 1.0 is a value close to the overall gear ratio at the OD end of the belt type continuously variable transmission mechanism on its own, and it can be seen that the effect in enlarging the gear ratio on the OD side is particularly prominent.

In particular, since the speed-reducing gear formed from the first and second reduction gears 25 and 26 and the speed-increasing gear formed from the first and second induction gears 27 and 28 are independent from each other, the degree of freedom in setting the gear ratios thereof is high, and it is possible to set the gear ratio of the first and second reduction gears 25 and 26 to be small from the viewpoint of strength of the first and second pulleys 21 and 22 of the belt type continuously variable transmission mechanism 20 in the LOW mode, and to set the gear ratio of the first and second induction gears 27 and 28 to be large in order to reduce the engine rotational speed at a time of high vehicle speed in the HI mode.

Furthermore, since the first final drive gear 31 and the second final drive gear 29 are separately supported, it becomes possible to freely set the gear ratios from the first and second final drive gears 31 and 29 to the final driven gear 34, thus increasing the starting driving force in the LOW mode and lowering the cruising rotational speed of the engine E in the HI mode.

Moreover, in the LOW mode, since there is one occurrence of gear meshing involving the first and second reduction gears 25 and 26 before the belt type continuously variable transmission mechanism 20, and in the HI mode there is one occurrence of gear meshing involving the first and second induction gears 27 and 28 before the belt type continuously variable transmission mechanism 20, it becomes unnecessary to provide a chain drive mechanism and convert the direction of rotation, and it becomes possible to simplify the structure.

Furthermore, it is possible to set the gear ratio of the belt type continuously variable transmission mechanism 20, which is conventionally around 0.4 to 0.5 at a time of normal high vehicle speed, to around 1.0 by appropriately setting the gear ratio of the first and second reduction gears 27 and 28 in the HI mode. This enables not only any difference in rotational speed between the first and second pulleys 21 and 22 when cruising to be reduced to thus eliminate the need for a centrifugal hydraulic canceller for the first pulley 21 on the driven side, but also enables the oil pressure for maintaining the gear ratio of the first and second pulleys 21 and 22 to be decreased to thus reduce the load on a hydraulic pump and, moreover, the minimum wind radius of the endless belt 23 around the first and second pulleys 21 and 22 can be increased, thus improving the transmission efficiency and improving the durability of the endless belt 23.

Furthermore, since the input switching mechanism 24, the first output switching mechanism 32, and the second output switching mechanism 32, 30 are formed from a dog clutch, compared with a case in which a friction clutch is used, the drag resistance can be reduced. In particular, since the input switching mechanism 24 can switch between transmission of the driving force to the first and second reduction gears 25 and 26 side and transmission of the driving force to the first and second induction gears 27 and 28 side by means of a single actuator, the structure can be simplified.

Moreover, since the arrangement is such that an outer peripheral part of the input switching mechanism 24 overlaps an outer peripheral part of the first pulley 21 or an outer peripheral part of the second pulley 22 of the belt type continuously variable transmission mechanism 20 when viewed in the axial direction of the main input shaft 13, it becomes possible to utilize dead space between the first pulley 21 and the second pulley 22 effectively, and the main input shaft 13, the input switching mechanism 24, and the belt type continuously variable transmission mechanism 20 can be laid out without interfering with each other.

Second Embodiment

A second embodiment of the present invention is now explained by reference to FIG. 12 to FIG. 19. In the second and subsequent embodiments, components corresponding to the components of the first embodiment are denoted by the same reference numerals and symbols as those of the first embodiment, and duplication of the explanation is therefore omitted.

Figure 12:
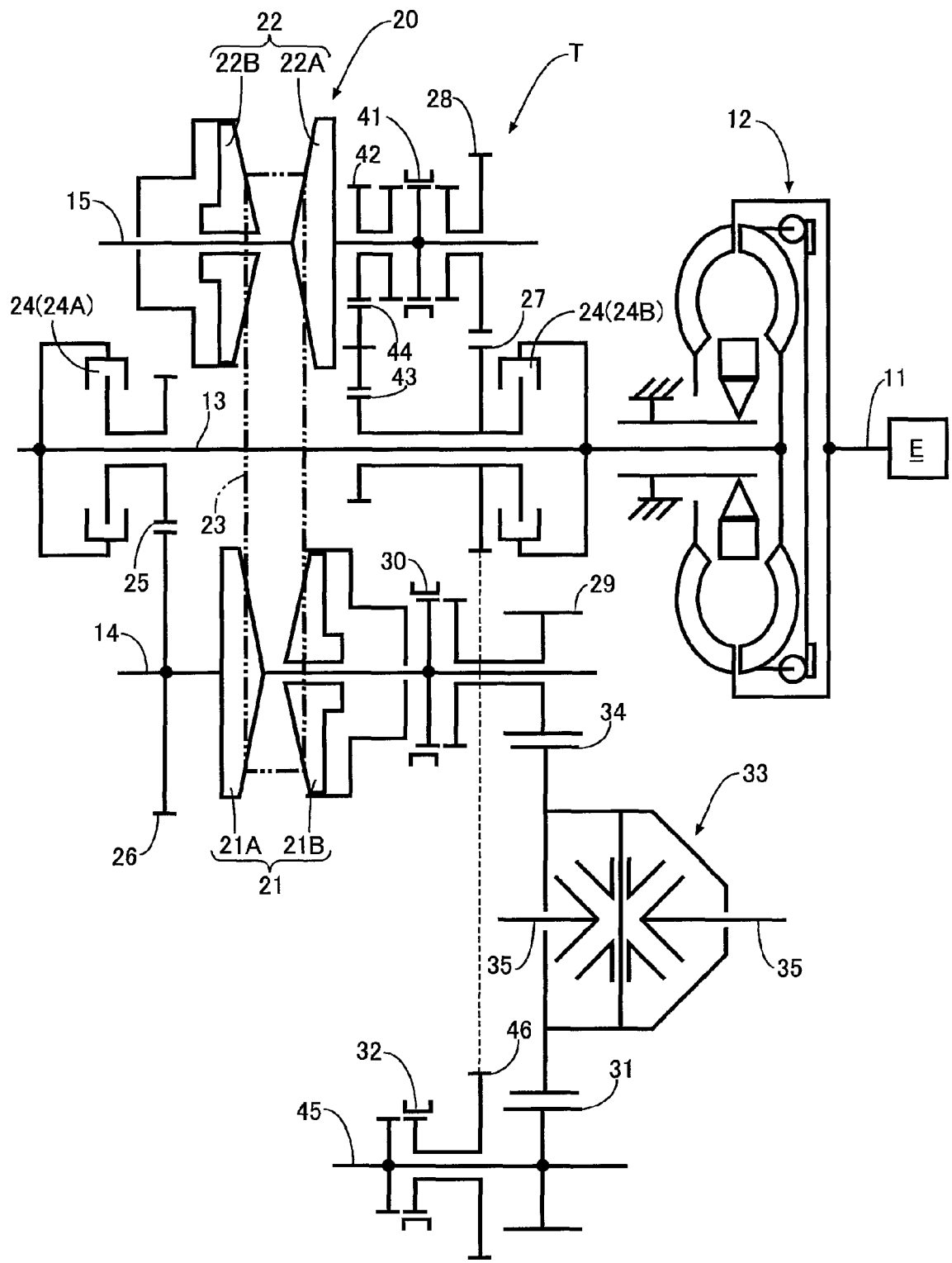
FIG. 12 is a skeleton diagram of a continuously variable transmission. (second embodiment)

In the first embodiment shown in FIG. 1, the main input shaft 13 is divided into the first section 13A and the second section 13B, but in the second embodiment shown in FIG. 12 a main input shaft 13 is not divided. Furthermore, in the first embodiment the input switching mechanism 24 is not divided, but in the second embodiment an input switching mechanism 24 is divided into a LOW friction clutch 24A and a HI friction clutch 24B.

Moreover, a forward-reverse switching mechanism 41, which is a dog clutch, is provided on a second auxiliary input shaft 15 of the second embodiment. When a sleeve of the forward-reverse switching mechanism 41 moves rightward, a second induction gear 28 is coupled to the second auxiliary input shaft 15, and when the sleeve of the forward-reverse switching mechanism 41 moves leftward, a reverse drive gear 42 is coupled to the second auxiliary input shaft 15. The reverse drive gear 42 is connected to a reverse driven gear 43 provided integrally with a first induction gear 27 via a reverse idle gear 44.

Furthermore, in the first embodiment the first final drive gear 31 and the first output switching mechanism 32 are provided on the second auxiliary input shaft 15, but in the second embodiment they are provided on a third output shaft 45, which is newly provided. A third reduction gear 46 meshing with the first induction gear 27 is relatively rotatably supported on the third output shaft 45, and the third reduction gear 46 can be coupled to the third output shaft 45 via the first output switching mechanism 32. The first final drive gear 31 fixedly provided on the third output shaft 45 meshes with a final driven gear 34.

Figure 13:
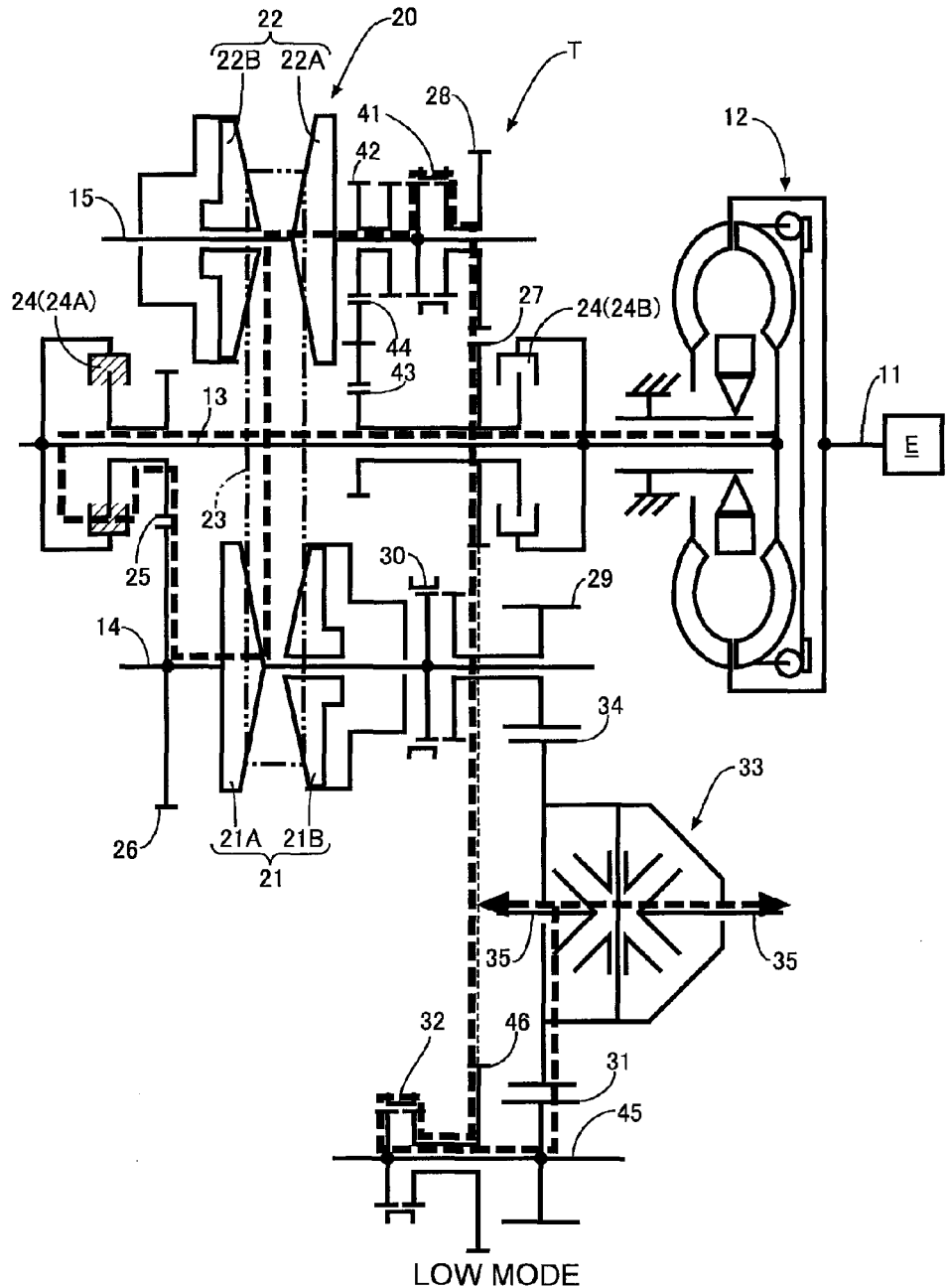
FIG. 13 is a torque flow diagram of a LOW mode. (second embodiment)

FIG. 13 shows a LOW mode of a continuously variable transmission T. In the LOW mode, the LOW friction clutch 24A of the input switching mechanism 24 is engaged, the first output switching mechanism 32 is engaged, a second output switching mechanism 30 is disengaged, and the forward-reverse switching mechanism 41 is switched to the forward side (rightward movement).

As a result, the driving force of the engine E is transmitted to driven wheels via the path: crankshaft 11 → torque converter 12 → main input shaft 13 → LOW friction clutch 24A of input switching mechanism 24 → first reduction gear 25 → second reduction gear 26 → first auxiliary input shaft 14 → first pulley 21 → endless belt 23 → second pulley 22 → second auxiliary input shaft 15 → forward-reverse switching mechanism 41 → second induction gear 28 → first induction gear 27 → third reduction gear 46 → first output switching mechanism 32 → third output shaft 45 → first final drive gear 31 → final driven gear 34 → differential gear 33 → drive shafts 35 and 35.

In the LOW mode, the belt type continuously variable transmission mechanism 20 transmits the driving force from the first auxiliary input shaft 14 side to the second auxiliary input shaft 15 side, and according to this change in gear ratio the overall gear ratio of the continuously variable transmission T is changed.

Figure 14:
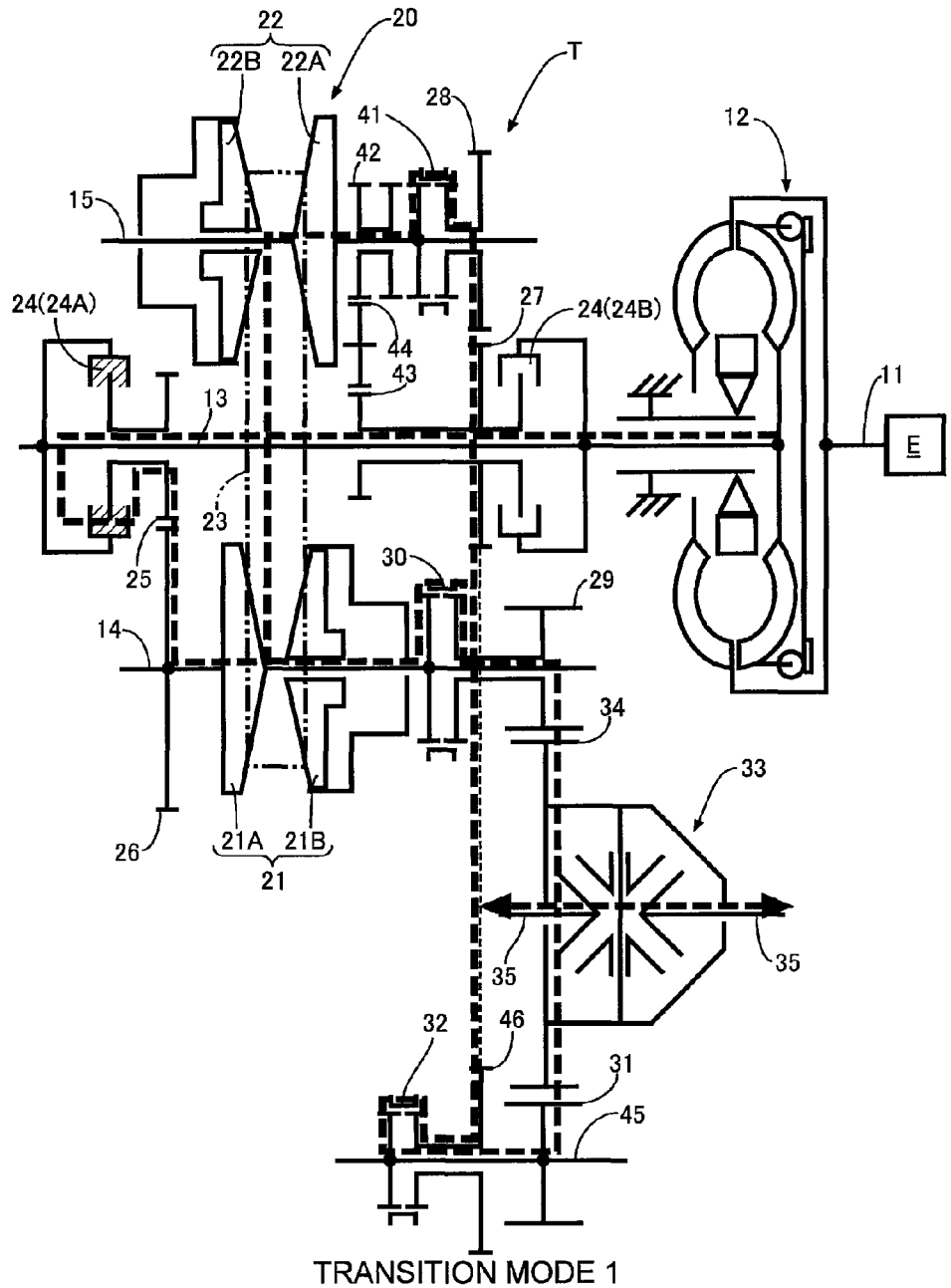
FIG. 14 is a torque flow diagram of a transition mode 1. (second embodiment)

FIG. 14 shows a transition mode 1, which is the first half of a transition from the LOW mode to a HI mode, which is described later. In the transition mode 1, the LOW friction clutch 24A of the input switching mechanism 24 is engaged, the first output switching mechanism 32 is engaged, the second output switching mechanism 30 is engaged, the forward-reverse switching mechanism 41 is switched to the forward side (rightward movement), and the LOW mode and a directly coupled LOW mode (see FIG. 18), which is described later, are simultaneously established.

Figure 15:
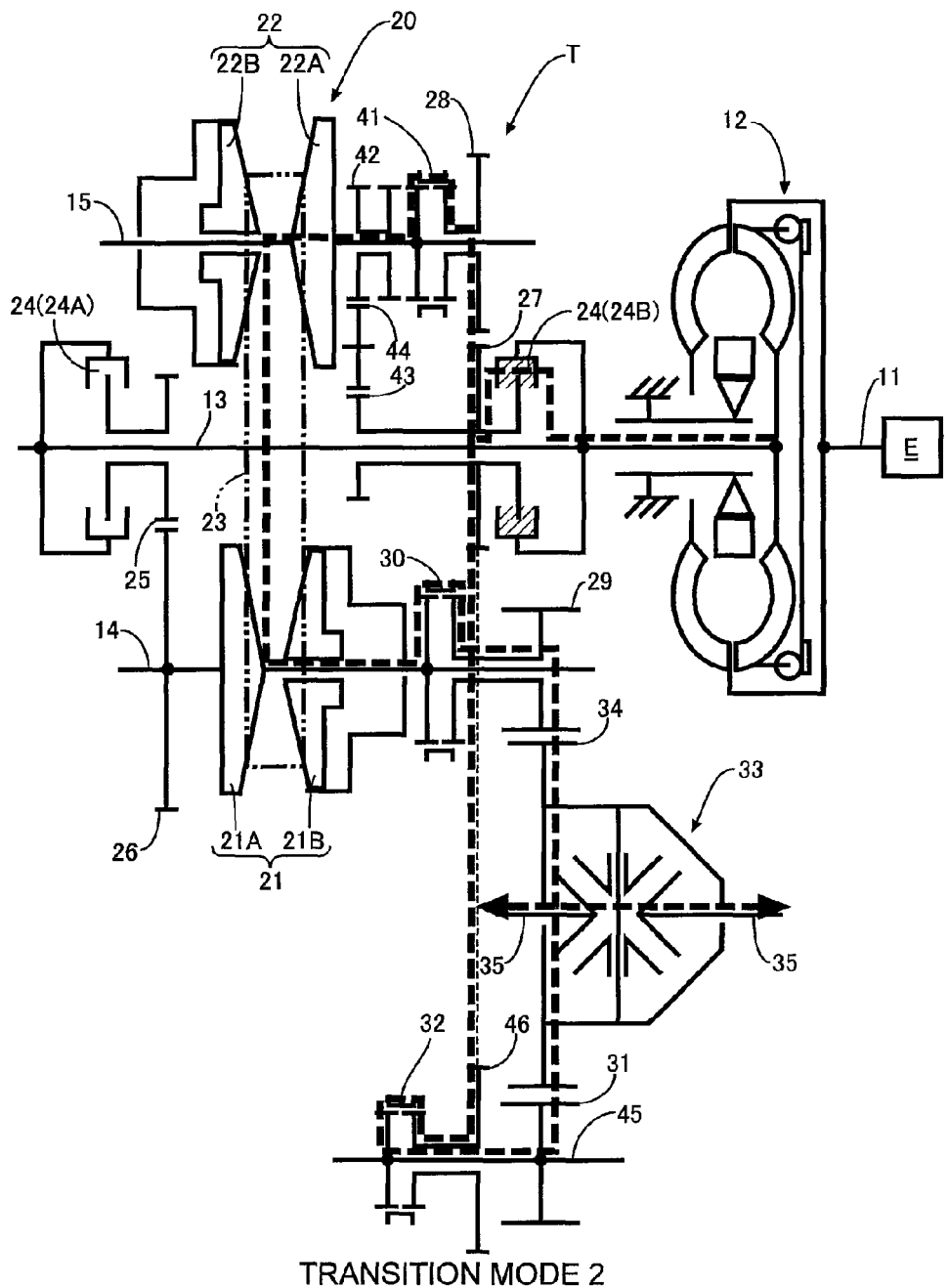
FIG. 15 is a torque flow diagram of a transition mode 2. (second embodiment)

FIG. 15 shows a transition mode 2, which is the second half of the transition from the LOW mode to the HI mode, which is described later. In the transition mode 2, the HI friction clutch 24B of the input switching mechanism 24 is engaged, the first output switching mechanism 32 is engaged, the second output switching mechanism 30 is engaged, the forward-reverse switching mechanism 41 is switched to the forward side (rightward movement), and the HI mode (see FIG. 16), which is described later, and a directly coupled HI mode (see FIG. 19), which is described later, are simultaneously established.

The transition mode 1 and the transition mode 2 are for carrying out transition of the LOW mode to the HI mode smoothly, and details thereof are given later.

Figure 16:
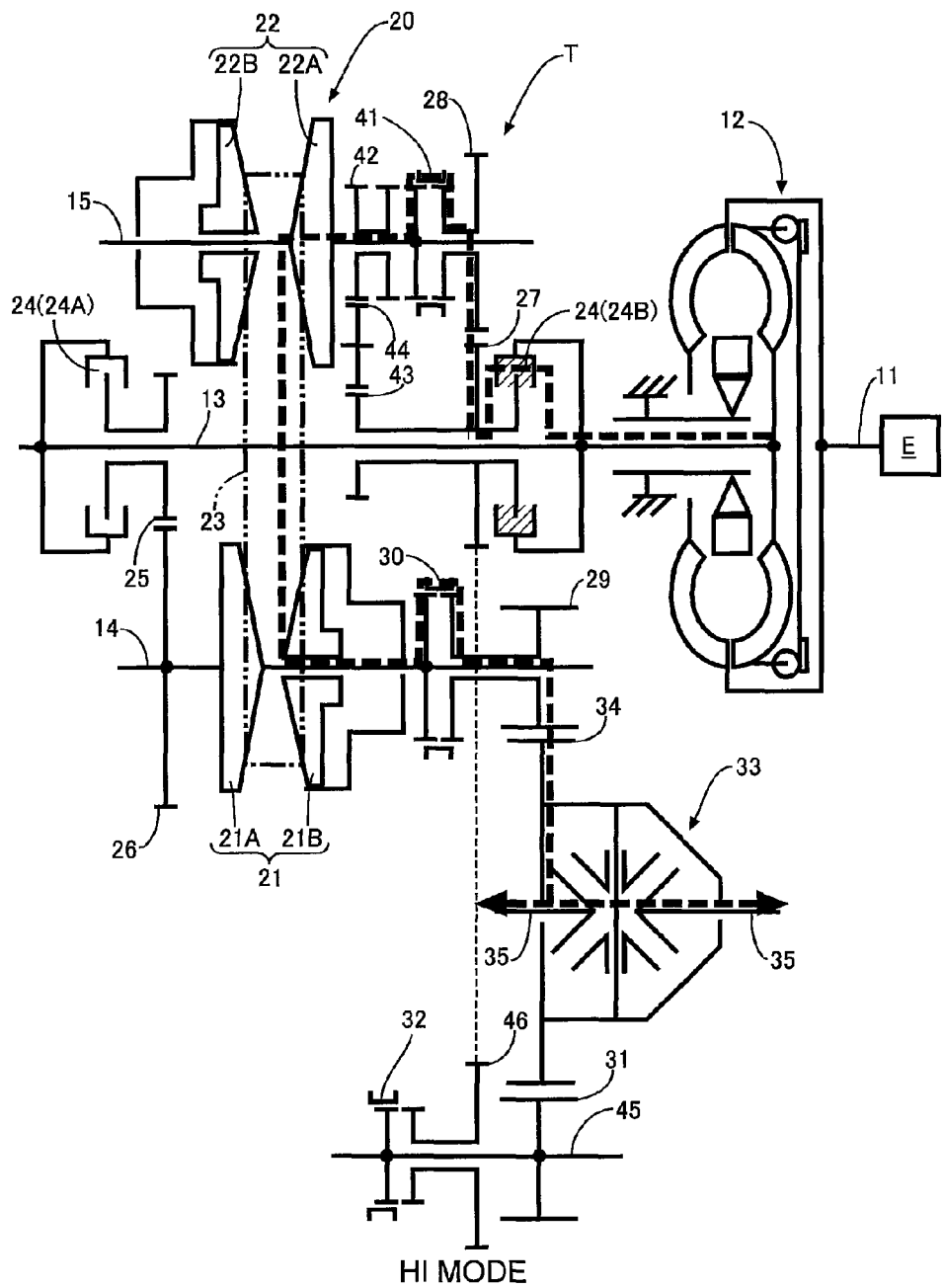
FIG. 16 is a torque flow diagram of a HI mode. (second embodiment)

FIG. 16 shows the HI mode of the continuously variable transmission T. In the HI mode, the HI friction clutch 24B of the input switching mechanism 24 is engaged, the first output switching mechanism 32 is disengaged, the second output switching mechanism 30 is engaged, and the forward-reverse switching mechanism 41 is switched to the forward side (rightward movement).

As a result, the driving force of the engine E is transmitted to the driven wheels via the path: crankshaft 11 → torque converter 12 → main input shaft 13 → HI friction clutch 24B of input switching mechanism 24 → first induction gear 27 → second induction gear 28 → forward-reverse switching mechanism 41 → second auxiliary input shaft 15 → second pulley 22 → endless belt 23 → first pulley 21 → first auxiliary input shaft 14 → second output switching mechanism 30 → second final drive gear 29 → final driven gear 34 → differential gear 33 → drive shafts 35 and 35.

In the HI mode, the belt type continuously variable transmission mechanism 20 transmits the driving force from the second auxiliary input shaft 15 side to the first auxiliary input shaft 14 side, and according to this change in gear ratio the overall gear ratio of the continuously variable transmission T is changed.

Figure 17:
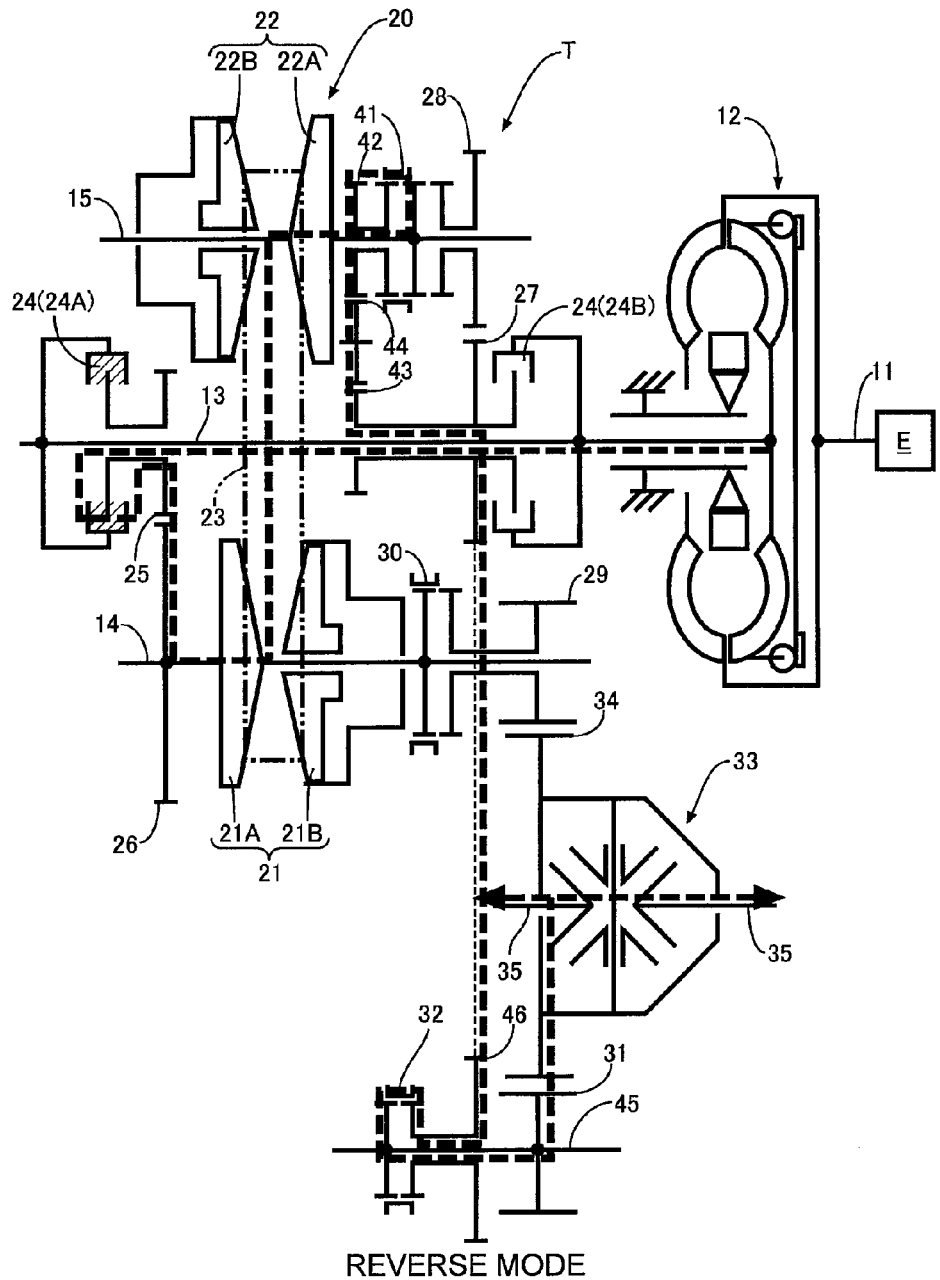
FIG. 17 is a torque flow diagram of a reverse mode. (second embodiment)

FIG. 17 shows a reverse mode of the continuously variable transmission T. In the reverse mode, the LOW friction clutch 24A of the input switching mechanism 24 is engaged, the first output switching mechanism 32 is engaged, the second output switching mechanism 30 is disengaged, and the forward-reverse switching mechanism 41 is switched to the reverse side (leftward movement).

As a result, the driving force of the engine E is transmitted to the driven wheels via the path: crankshaft 11 → torque converter 12 → main input shaft 13 → LOW friction clutch 24A of input switching mechanism 24 → first reduction gear 25 → second reduction gear 26 → first auxiliary input shaft 14 → first pulley 21 → endless belt 23 → second pulley 22 → second auxiliary input shaft 15 → forward-reverse switching mechanism 41 → reverse drive gear 42 → reverse idle gear 44 → reverse driven gear 43 → first induction gear 27 → third reduction gear 46 → first output switching mechanism 32 → third output shaft 45 → first final drive gear 31 → final driven gear 34 → differential gear 33 → drive shafts 35 and 35.

In the reverse mode, the belt type continuously variable transmission mechanism 20 transmits the driving force from the first auxiliary input shaft 14 side to the second auxiliary input shaft 15 side, and according to this change in gear ratio the overall gear ratio of the continuously variable transmission T is changed.

Figure 18:
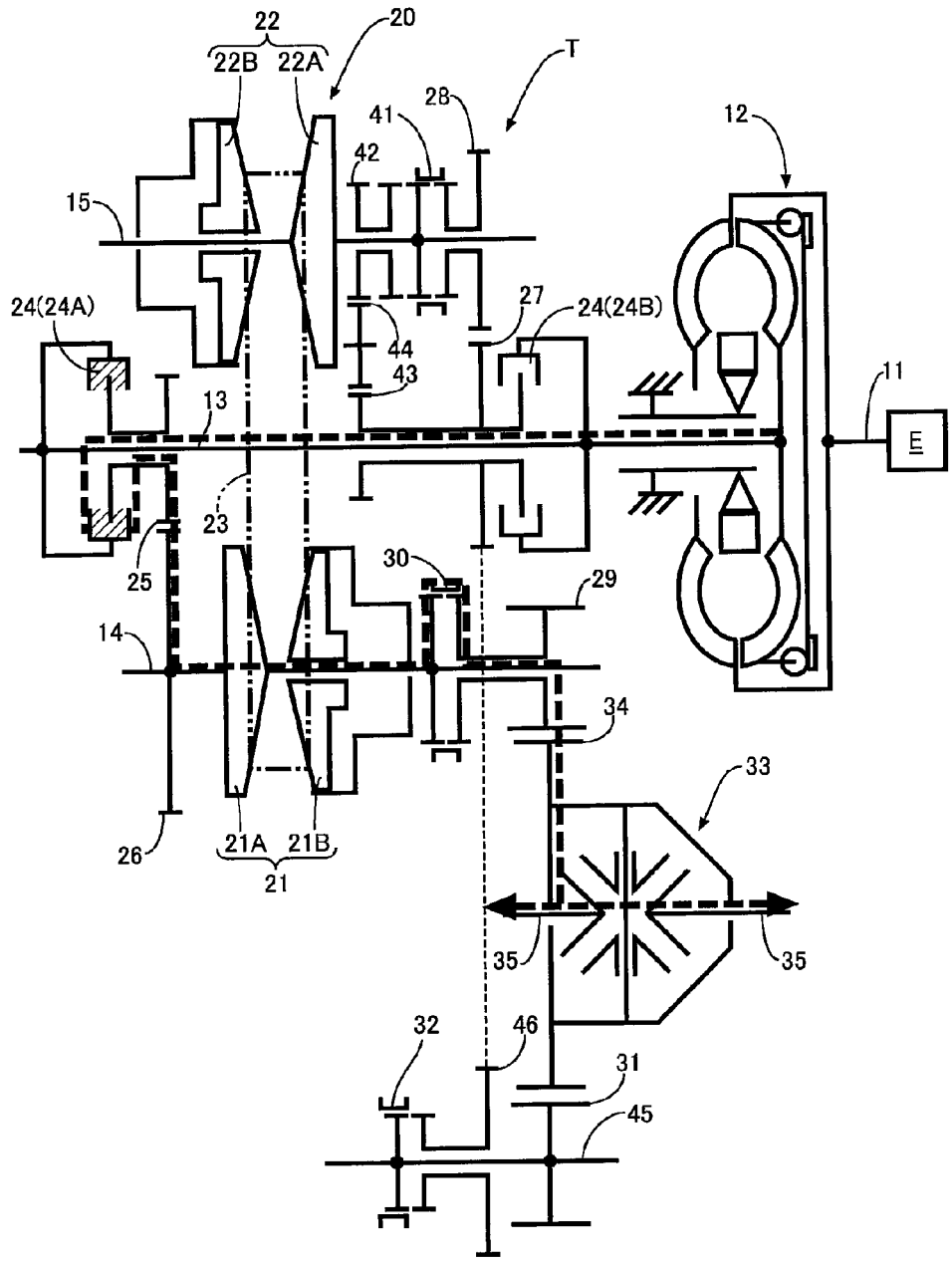
FIG. 18 is a torque flow diagram of a directly coupled LOW mode. (second embodiment)

FIG. 18 shows the directly coupled LOW mode of the continuously variable transmission T. In the directly coupled LOW mode, the LOW friction clutch 24A of the input switching mechanism 24 is engaged, the first output switching mechanism 32 is disengaged, the second output switching mechanism 30 is engaged, and the forward-reverse switching mechanism 41 is switched to the forward side (rightward movement).

As a result, the driving force of the engine E is transmitted to the driven wheels via the path: crankshaft 11 → torque converter 12 → main input shaft 13 → LOW friction clutch 24A of input switching mechanism 24 → first reduction gear 25 → second reduction gear 26 → first auxiliary input shaft 14 → second output switching mechanism 30 → second final drive gear 29 → final driven gear 34 → differential gear 33 → drive shafts 35 and 35.

In the directly coupled LOW mode, the belt type continuously variable transmission mechanism 20 is not actuated, and the overall gear ratio of the continuously variable transmission T is constant.

Figure 19:
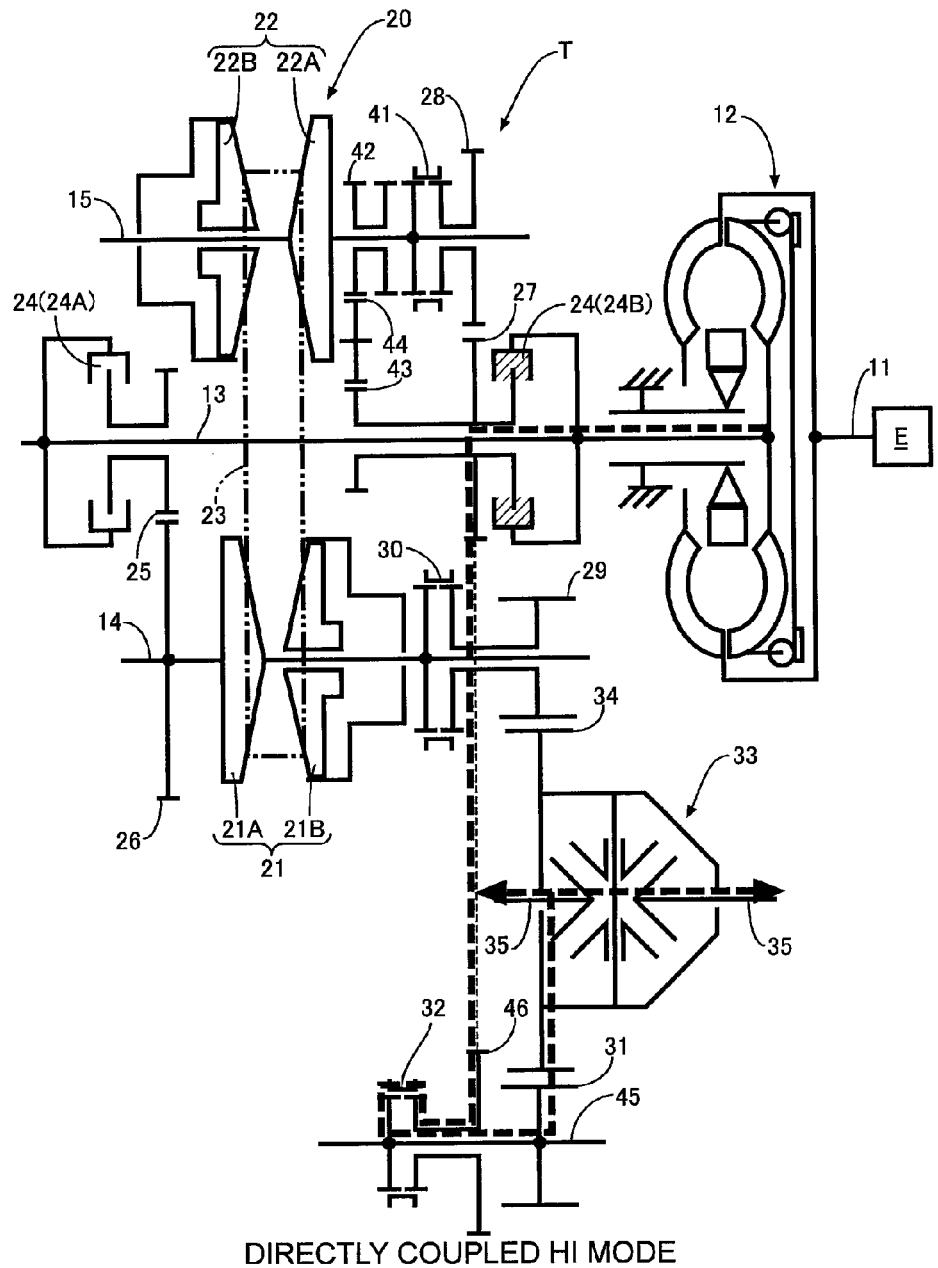
FIG. 19 is a torque flow diagram of a directly coupled HI mode. (second embodiment)

FIG. 19 shows the directly coupled HI mode of the continuously variable transmission T. In the directly coupled HI mode, the HI friction clutch 24B of the input switching mechanism 24 is engaged, the first output switching mechanism 32 is engaged, the second output switching mechanism 30 is disengaged, and the forward-reverse switching mechanism 41 is switched to the forward side (rightward movement) or a neutral position.

As a result, the driving force of the engine E is transmitted to the driven wheels via the path: crankshaft 11 → torque converter 12 → HI friction clutch 24B of input switching mechanism 24 → first induction gear 27 → third reduction gear 46 → first output switching mechanism 32 → third output shaft 45 → first final drive gear 31 → final driven gear 34 → differential gear 33 → drive shafts 35 and 35.

In the directly coupled HI mode, the belt type continuously variable transmission mechanism 20 is not actuated, and the overall gear ratio of the continuously variable transmission T is constant.

In the first embodiment, when the gear ratio from the first reduction gear 25 to the second reduction gear 26 is $i_{red}$, the gear ratio from the first induction gear 27 to the second induction gear 28 is $i_{ind}$, and the minimum gear ratio from the first pulley 21 to the second pulley 22 of the belt type continuously variable transmission mechanism 20 is $i_{min}$, the gear ratios are set so that $i_{red} \times i_{min} = i_{ind}$, when the gear ratio from the first final drive gear 31 to the final driven gear 34 is $i_{loF}$, and the gear ratio from the second final drive gear 29 to the final driven gear 34 is $i_{hiF}$, the gear ratios are set so that $i_{loF} \times i_{min} = i_{hiF}$, and it is thereby made possible to carry out actuation of the input switching mechanism 24, the first output switching mechanism 32, and the second output switching mechanism 30 smoothly without differential rotation.

On the other hand, in the second embodiment, the first final drive gear 31 is not provided on the second auxiliary input shaft 15 but is provided on the third output shaft 45, which is a separate shaft, and the second induction gear 28, the first induction gear 27, and the third reduction gear 46 are disposed between the second auxiliary input shaft 15 and the third output shaft 45. Therefore, instead of the relationship $i_{loF} \times i_{min} = i_{hiF}$ of the first embodiment, in the second embodiment it is necessary to set the numbers of teeth of the second induction gear 28, the first induction gear 27, and the third reduction gear 46 so that the relationship $i_{loF} \times i_{min} \times (i_{sec}/i_{ind}) = i_{hiF}$ holds.

$i_{sec}$ is the gear ratio from the first induction gear 27 to the third reduction gear 46. Therefore, for example, even when setting $i_{red} = 1.5$, $i_{hiF} = 2.0$, and $i_{min} = 0.5$ as in the first embodiment, if $i_{ind} = 0.75$, which is the gear ratio from the first induction gear 27 to the second induction gear 28, and $i_{sec} = 1.2$ so that $i_{sec}/i_{ind} = 1.6$, then by setting $i_{loF} = 2.5$ the second auxiliary input shaft 15 and the third output shaft 45 have the same rotational speed, and it becomes possible to carry out actuation of the forward-reverse switching mechanism 41, the first output switching mechanism 32, and the second output switching mechanism 30 smoothly without differential rotation. Moreover, by setting the first final drive gear 31 having $i_{loF} = 2.5$ to be equal to the external diameter of the first final drive gear 31 having $i_{loF} = 4.0$ of the first embodiment, it becomes possible to reduce the external diameters of the second final drive gear 29 and the final driven gear 34 relative to those of the first embodiment.

Furthermore, in accordance with the present embodiment, as shown in FIG. 13, in the LOW mode, with regard to the first and second induction gears 27 and 28, since torque is transmitted from the second induction gear 28 side to the first induction gear 27 side, the first and second induction gears 27 and 28, which were originally speed-increasing gears, can be utilized as speed-reducing gears, thus enabling the gear ratio of the LOW side of the overall gear ratio to be increased.

Moreover, since the first output switching mechanism 32 is provided on the third output shaft 45, compared with a case in which the first output switching mechanism 32 is provided on the second auxiliary input shaft 15 or the main input shaft 12, the dimension in the axial direction of the continuously variable transmission T can be reduced.

Third Embodiment

Figure 20:
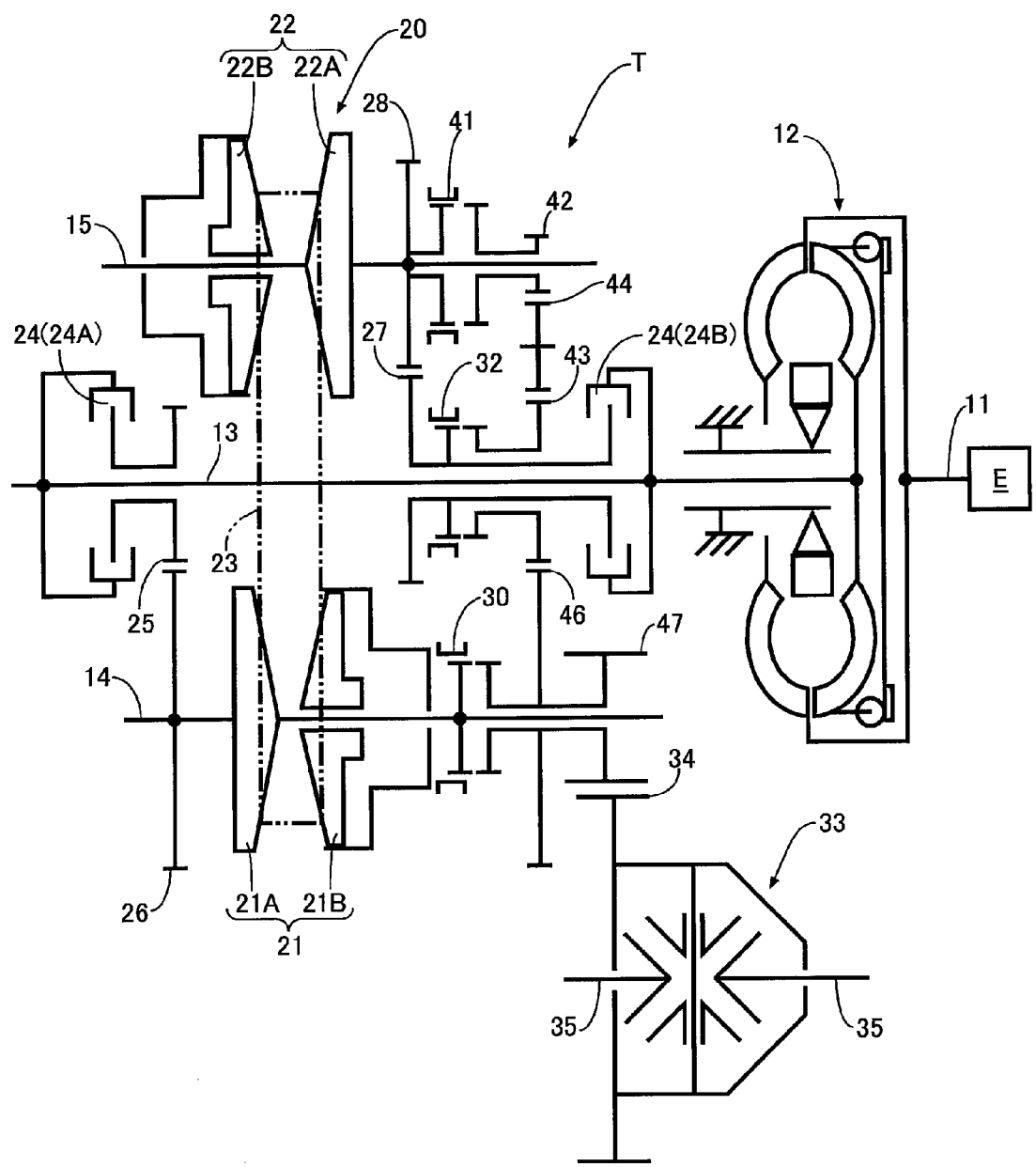
FIG. 20 is a skeleton diagram of a continuously variable transmission. (third embodiment)

A third embodiment of the present invention is now explained by reference to FIG. 20 and FIG. 21.

As is clear from a comparison between the second embodiment (see FIG. 12) and the third embodiment (see FIG. 20), the third embodiment is different from the second embodiment in terms of the function of a forward-reverse switching mechanism 41 provided on a second auxiliary input shaft 15. The forward-reverse switching mechanism 41 can couple a second induction gear 28 fixedly provided on the second auxiliary input shaft 15 and a reverse drive gear 42 relatively rotatably supported on the second auxiliary input shaft 15, and a reverse driven gear 43 is relatively rotatably supported on a first induction gear 27 and can be coupled to the first induction gear 27 by means of a first output switching mechanism 32.

The reverse driven gear 43 meshes with a third reduction gear 46 relatively rotatably supported on a first auxiliary input shaft 14, and the third reduction gear 46 can be coupled to the first auxiliary input shaft 14 by means of a second output switching mechanism 30. A single final drive gear 47 provided integrally with the third reduction gear 46 meshes with a final driven gear 34.

The third embodiment corresponds to one in which the third output shaft 45 of the second embodiment is eliminated and the first output switching mechanism 32, which had been provided on the third output shaft 45, is moved to a main input shaft 13, and the function thereof is basically the same as that of the second embodiment. A table of engagement of a LOW friction clutch 24A of an input switching mechanism 24, a HI friction clutch 24B of the input switching mechanism 24, the forward-reverse switching mechanism 41, the first output switching mechanism 32, and the second output switching mechanism 30 of the third embodiment is shown in FIG. 21.

In accordance with the present embodiment, since the third output shaft 45 of the second embodiment is not necessary, the number of shafts can be reduced by one, thus reducing the dimension in the radial direction of an automatic transmission T. However, due to the third reduction gear 46 being moved from the third output shaft 45 to the second auxiliary input shaft 15, the dimension in the axial direction of the automatic transmission T increases slightly.

Fourth Embodiment

Figure 22:
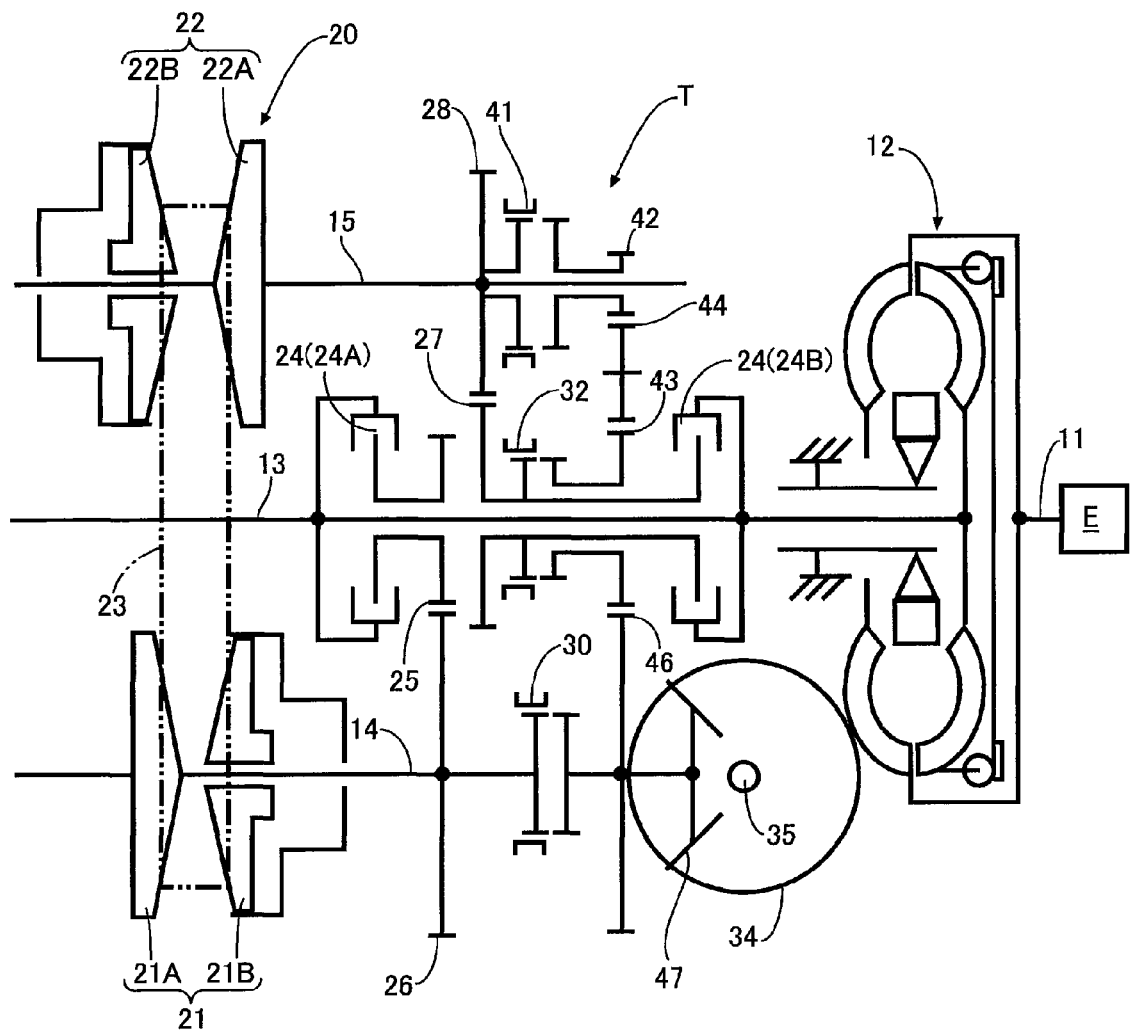
FIG. 22 is a skeleton diagram of a continuously variable transmission. (fourth embodiment)

A fourth embodiment of the present invention is now explained by reference to FIG. 22.

The fourth embodiment is a variation of the third embodiment; a final drive gear 47 and a final driven gear 34 are formed from bevel gears, and the axis of a differential gear 33 is made perpendicular to axes of a main input shaft 13, a first auxiliary input shaft 14, and a second auxiliary input shaft 15.

In the third and fourth embodiments, due to the third reduction gear 46 being moved from the third output shaft 45 to the second auxiliary input shaft 15, the dimension in the axial direction of the automatic transmission T increases slightly, but in accordance with use of the fourth embodiment, it becomes possible to employ an FF layout in which a continuously variable transmission T is placed upright, which has less restriction in the dimension in the vehicle body fore-and-aft direction, and the ease of mounting it on the vehicle body improves.

Fifth Embodiment

Figure 23:
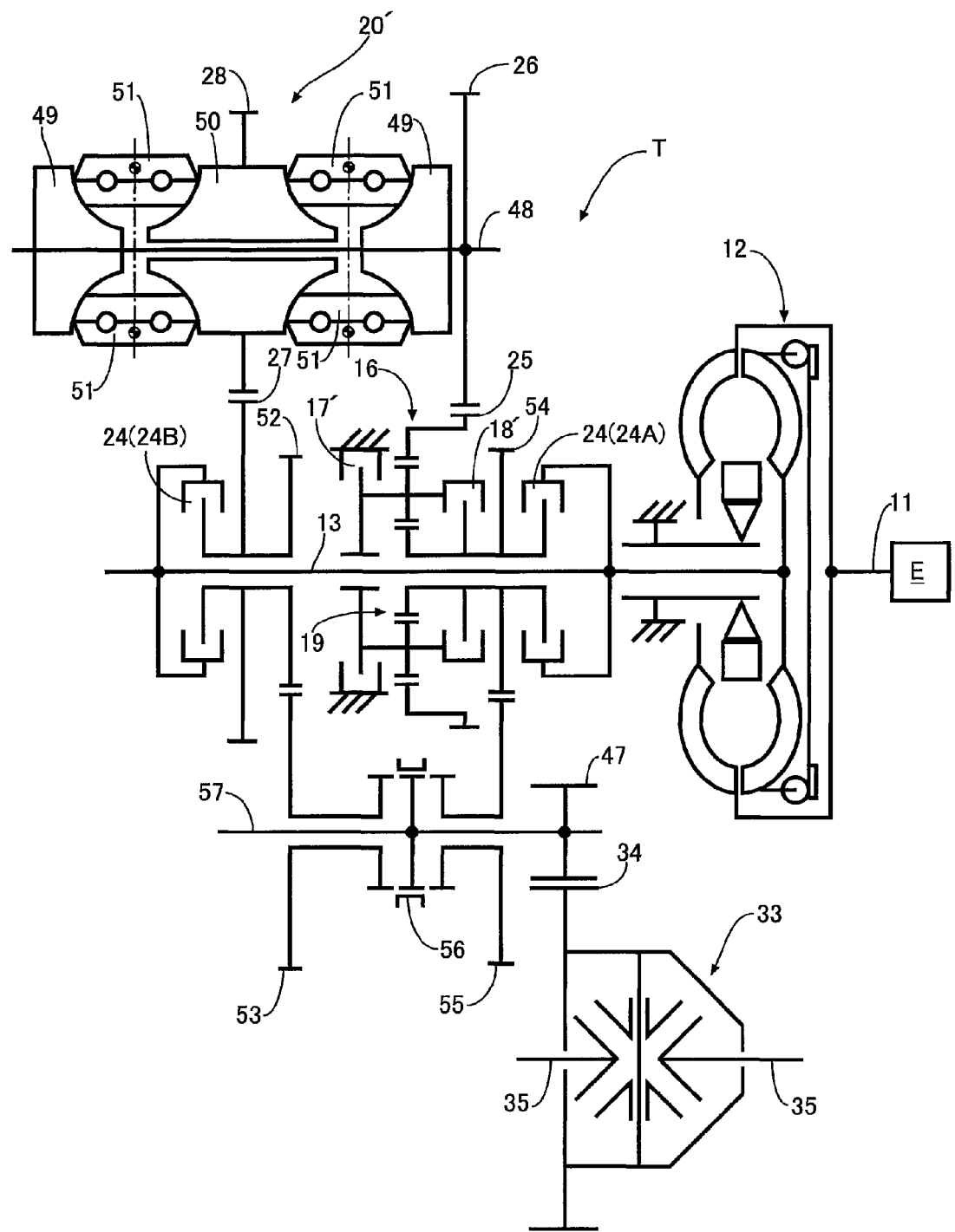
FIG. 23 is a skeleton diagram of a continuously variable transmission. (fifth embodiment)

A fifth embodiment of the present invention is now explained by reference to FIG. 23 and FIG. 24.

The continuously variable transmission mechanisms of the first to fourth embodiments are of the belt type continuously variable transmission mechanism 20, but a continuously variable transmission mechanism of the fifth embodiment is a known toroidal continuously variable transmission mechanism 20'. With regard to the toroidal continuously variable transmission mechanism 20', four power rollers 51 are tiltably disposed between a pair of input disks 49 and 49 fixedly provided on a gear shaft 48 and an output disk 50 rotatably supported on the gear shaft 48 between the pair of input disks 49 and 49.

A forward-reverse switching mechanism 16 disposed on the outer periphery of the main input shaft 13 is formed from a planetary gear mechanism 19, a sun gear and a carrier relatively rotatably supported on a main input shaft 13 can be coupled to each other via a reverse clutch 18', and the carrier can be coupled to a casing via a forward brake 17'. The sun gear of the planetary gear mechanism 19 can be coupled to the main input shaft 13 via a LOW friction clutch 24A of an input switching mechanism 24, and a first reduction gear 25 provided integrally with a ring gear of the planetary gear mechanism 19 meshes with a second reduction gear 26 fixedly provided on the gear shaft 48 of the toroidal continuously variable transmission mechanism 20'. Furthermore, a first induction gear 27 relatively rotatably supported on the main input shaft 13 meshes with a second induction gear 28 fixedly provided on the output disk 50 of the toroidal continuously variable transmission mechanism 20', and the first induction gear 27 can be coupled to the main input shaft 13 via a HI friction clutch 24B of the input switching mechanism 24.

With regard to the toroidal continuously variable transmission mechanism 20', unlike the belt type continuously variable transmission mechanism 20, since the rotational directions of the second reduction gear 26 and the second induction gear 28 are opposite to each other, by reversing the rotational direction of the second reduction gear 26 using the planetary gear mechanism 19 the rotational directions of the elements on the main input shaft 13 when traveling forward are made to coincide with each other.

A LOW first output gear 52 provided integrally with the first induction gear 27 meshes with a LOW second output gear 53 relatively rotatably supported on an output shaft 57, and a HI first output gear 54 provided integrally with the sun gear of the planetary gear mechanism 19 meshes with a HI second output gear 55 relatively rotatably supported on the output shaft 57. The LOW second output gear 53 and the HI second output gear 55 can be selectively coupled to the output shaft 57 via an output switching mechanism 56, which is a dog clutch.

Therefore, as shown in the engagement table of FIG. 24, in a LOW mode, when the LOW clutch 24A of the input switching mechanism 24 is engaged, the output switching mechanism 56 is switched to the LOW side (leftward movement), and the forward brake 17' of the forward-reverse switching mechanism 16 is engaged, the driving force of the engine E is transmitted to driven wheels via the path: crankshaft 11 → torque converter 12 → main input shaft 13 → LOW friction clutch 24A → planetary gear mechanism 19 → first reduction gear 25 → second reduction gear 26 → gear shaft 48 → input disks 49 and 49 → power rollers 51 → output disk 50 → second induction gear 28 → first induction gear 27 → LOW first output gear 52 → LOW second output gear 53 → output switching mechanism 56 → output shaft 57 → final drive gear 47 → final driven gear 34 → differential gear 33 → drive shafts 35 and 35.

Furthermore, in the HI mode, when the HI clutch 24B of the input switching mechanism 24 is engaged, the output switching mechanism 56 is switched to the HI side (rightward movement), and the forward brake 17' of the forward-reverse switching mechanism 16 is engaged, the driving force of the engine E is transmitted to the driven wheels via the path: crankshaft 11 → torque converter 12 → main input shaft 13 → HI friction clutch 24B → first induction gear 27 → second induction gear 28 → output disk 50 → power rollers 51 → input disks 49 and 49 → gear shaft 48 → second reduction gear 26 → first reduction gear 25 → planetary gear mechanism 19 → HI first output gear 54 → HI second output gear 55 → output switching mechanism 56 → output shaft 57 → final drive gear 47 → final driven gear 34 → differential gear 33 → drive shafts 35 and 35.

Moreover, in the reverse mode, when the LOW clutch 24A of the input switching mechanism 24 is engaged, the output switching mechanism 56 is switched to the LOW side (leftward movement), and the reverse clutch 18' of the forward-reverse switching mechanism 16 is engaged, the driving force of the engine E is transmitted via the same path as that for the LOW mode, but since the rotational direction is not reversed by the planetary gear mechanism 19, the vehicle can travel backward.

Furthermore, in the first half of a LOW↔HI transition mode, the LOW mode and a directly coupled LOW mode are simultaneously established, and in the directly coupled LOW mode the driving force of the engine E is transmitted to the driven wheels via the path: crankshaft 11 → torque converter 12 → main input shaft 13 → LOW friction clutch 24A → HI first output gear 54 → HI second output gear 55 → output switching mechanism 56 → output shaft 57 → final drive gear 47 → final driven gear 34 → differential gear 33 → drive shafts 35 and 35.

In the second half of the LOW↔HI transition mode, a HI mode and a directly coupled HI mode are simultaneously established, and in the directly coupled HI mode the driving force of the engine E is transmitted to the driven wheels via the path: crankshaft 11 → torque converter 12 → main input shaft 13 → HI friction clutch 24B → LOW first output gear 52 → LOW second output gear 53 → output switching mechanism 56 → output shaft 57 → final drive gear 47 → final driven gear 34 → differential gear 33 → drive shafts 35 and 35.

Therefore, changing over the grip of the LOW friction clutch 24A and the HI friction clutch 24B and switching of the output switching mechanism 56 at the same time enables the LOW mode and the HI mode to be switched smoothly.

In accordance with present embodiment, the driving force of the engine E can be outputted through the first and second induction gears 27 and 28 from the first and second reduction gears 25 and 26 via the toroidal continuously variable transmission mechanism 20', or the driving force of the engine E can be outputted though the first and second reduction gears 25 and 26 from the first and second induction gears 27 and 28 via the toroidal continuously variable transmission mechanism 20'.

Embodiments of the present invention are explained above, but the present invention may be modified in a variety of ways as long as the modifications do not depart from the spirit and scope thereof.

For example, the continuously variable transmission mechanism of the present invention is not limited to the belt type continuously variable transmission mechanism 20 or the toroidal continuously variable transmission mechanism 20' of the embodiments, and any transmission mechanism that carries out gear shift while transmitting a driving force in either a forward or reverse direction may be employed.

The invention claimed is:

1. A continuously variable transmission comprising:
a main input shaft into which a driving force from a drive source is inputted;
a continuously variable transmission mechanism;
a first input path that connects the main input shaft to the continuously variable transmission mechanism;
a second input path that connects the main input shaft to the continuously variable transmission mechanism;
an input switching mechanism that selectively transmits a driving force from the main input shaft to the first input path or the second input path;
a first output path that outputs a driving force from the continuously variable transmission mechanism, the driving force outputted by the first output path having been changed by a first predetermined gear ratio;
a second output path that outputs the driving force from the continuously variable transmission mechanism, the driving force outputted by the second output path having been changed by a second predetermined gear ratio; and
an output switching mechanism that selectively transmits the driving force outputted by the continuously variable transmission mechanism to the first output path or the second output path,
wherein a first speed-reducing gear that decreases a speed of an input into the continuously variable transmission mechanism is disposed in the first input path,
wherein a speed-increasing gear that increases the speed of the input into the continuously variable transmission mechanism is disposed in the second input path,
wherein a second speed-reducing gear that decreases a speed of the output from the continuously variable transmission mechanism is disposed in the first output path, and
wherein a third speed-reducing gear that decreases the speed of the output from the continuously variable transmission mechanism is disposed in the second output path, the third speed-reducing gear having a speed reduction ratio which is different from a speed reduction ratio of the second speed-reducing gear.

2. The continuously variable transmission according to claim 1,
wherein the first speed-reducing gear comprises a pair of gears, a first gear of the pair of gears of the first speed-reducing gear being capable of being engaged with and disengaged from the main input shaft by means of the input switching mechanism, and a second gear of the pair of gears of the first speed-reducing gear being fixedly provided on a first auxiliary input shaft connected to the continuously variable transmission mechanism, and
wherein the speed-increasing gear comprises a pair of gears, a first gear of the pair of gears of the speed-increasing gear being capable of being engaged with and disengaged from the main input shaft by means of the input switching mechanism, and a second gear of the pair of gears of the speed-increasing gear being fixedly provided on a second auxiliary input shaft connected to the continuously variable transmission mechanism.

3. The continuously variable transmission according to claim 2, wherein the continuously variable transmission mechanism comprises a first pulley provided on the first auxiliary input shaft, a second pulley provided on the second auxiliary input shaft, and an endless belt wound around the first and second pulleys, the main input shaft being disposed in parallel to the first auxiliary input shaft and the second auxiliary input shaft, and the input switching mechanism overlapping the first pulley or the second pulley in an axial direction.

4. The continuously variable transmission according to claim 3, wherein the input switching mechanism is disposed in the vicinity of an end part, on the side opposite to the drive source in the axial direction, of the main input shaft, and either one of one gear of the first speed-reducing gear and one gear of the speed-increasing gear is formed as a dog clutch that can be coupled to the main input shaft.

5. The continuously variable transmission according to claim 3, wherein the input switching mechanism comprises a first friction clutch disposed in the vicinity of an end part, on the side opposite to the drive source in the axial direction, of the main input shaft, and a second friction clutch disposed in the vicinity of an end part, on the drive source side in the axial direction, of the main input shaft.

6. The continuously variable transmission according to claim 3,
wherein the main input shaft is divided into a first section on the drive source side and a second section on the input switching mechanism side, and a forward-reverse switching mechanism, which comprises a planetary gear mechanism having first to third elements, is disposed between the first and second sections, the first element being connected to the first section, the second element being connected to the second section, the first and second elements being capable of being coupled to each other via a clutch, and the third element being capable of being coupled to a casing via a brake.

7. The continuously variable transmission according to claim 2, wherein the input switching mechanism is disposed in the vicinity of an end part, on the side opposite to the drive source in the axial direction, of the main input shaft, and either one of one gear of the first speed-reducing gear and one gear of the speed-increasing gear is formed as a dog clutch that can be coupled to the main input shaft.

8. The continuously variable transmission according to claim 7,
wherein the main input shaft is divided into a first section on the drive source side and a second section on the input switching mechanism side, and a forward-reverse switching mechanism, which comprises a planetary gear mechanism having first to third elements, is disposed between the first and second sections, the first element being connected to the first section, the second element being connected to the second section, the first and second elements being capable of being coupled to each other via a clutch, and the third element being capable of being coupled to a casing via a brake.

9. The continuously variable transmission according to claim 2, wherein the input switching mechanism comprises a first friction clutch disposed in the vicinity of an end part, on the side opposite to the drive source in the axial direction, of the main input shaft, and a second friction clutch disposed in the vicinity of an end part, on the drive source side in the axial direction, of the main input shaft, the first friction clutch being capable of coupling one gear of the first speed-reducing gear to the main input shaft, and the second friction clutch being capable of coupling one gear of the speed-increasing gear to the main input shaft.

10. The continuously variable transmission according to claim 2, wherein the first auxiliary input shaft also functions as a second output shaft, a driving force of the second output shaft being outputted via the second output switching mechanism, and the second auxiliary input shaft also functions as a first output shaft, a driving force of the first output shaft being outputted via the first output switching mechanism and the speed-increasing gear.

11. The continuously variable transmission according to claim 10, wherein the first output switching mechanism is provided on a third output shaft.

12. The continuously variable transmission according to claim 11, wherein a reverse gear is disposed in the first output path.

13. The continuously variable transmission according to claim 10, wherein the first output switching mechanism is provided on the main input shaft.

14. The continuously variable transmission according to claim 2,
wherein the main input shaft is divided into a first section on the drive source side and a second section on the input switching mechanism side, and a forward-reverse switching mechanism, which comprises a planetary gear mechanism having first to third elements, is disposed between the first and second sections, the first element being connected to the first section, the second element being connected to the second section, the first and second elements being capable of being coupled to each other via a clutch, and the third element being capable of being coupled to a casing via a brake.

15. The continuously variable transmission according to claim 1, wherein the output switching mechanism is formed as a dog clutch.

16. The continuously variable transmission according to claim 15, wherein the input switching mechanism is disposed in the vicinity of an end part, on the side opposite to the drive source in the axial direction, of the main input shaft, and either one of one gear of the first speed-reducing gear and one gear of the speed-increasing gear is formed as a dog clutch that can be coupled to the main input shaft.

17. The continuously variable transmission according to claim 15, wherein the input switching mechanism comprises a first friction clutch disposed in the vicinity of an end part, on the side opposite to the drive source in the axial direction, of the main input shaft, and a second friction clutch disposed in the vicinity of an end part, on the drive source side in the axial direction, of the main input shaft.

18. The continuously variable transmission according to claim 15,
wherein the main input shaft is divided into a first section on the drive source side and a second section on the input switching mechanism side, and a forward-reverse switching mechanism, which comprises a planetary gear mechanism having first to third elements, is disposed between the first and second sections, the first element being connected to the first section, the second element being connected to the second section, the first and second elements being capable of being coupled to each other via a clutch, and the third element being capable of being coupled to a casing via a brake.

19. The continuously variable transmission according to claim 1, wherein the main input shaft is divided into a first section on the drive source side and a second section on the input switching mechanism side, and a forward-reverse switching mechanism, which comprises a planetary gear mechanism having first to third elements, is disposed between the first and second sections, the first element being connected to the first section, the second element being connected to the second section, the first and second elements being capable of being coupled to each other via a clutch, and the third element being capable of being coupled to a casing via a brake.

20. The continuously variable transmission according to claim 1,
wherein the continuously variable transmission mechanism comprises an input disk, an output disk, and a power roller held between the input disk and the output disk,
wherein the first input path transmitting the driving force from the drive source to one of the input disk and the output disk and the second input path transmitting the driving force from the drive source to the other of the input disk and the output disk, and
wherein when the driving force of the drive source is inputted into the first input path, the second input path functions as the first output path, and when the driving force of the drive source is inputted into the second input path, the first input path functions as the second output path.

* * * * *